US010003397B2

United States Patent
Mazzarella et al.

(10) Patent No.: US 10,003,397 B2
(45) Date of Patent: *Jun. 19, 2018

(54) DYNAMIC WIRELESS AERIAL MESH NETWORK

(71) Applicant: Mutualink, Inc., Wallingford, CT (US)

(72) Inventors: Joseph R. Mazzarella, Tolland, CT (US); Michael S. Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/594,066

(22) Filed: May 12, 2017

(65) Prior Publication Data

US 2017/0250749 A1    Aug. 31, 2017

Related U.S. Application Data

(63) Continuation of application No. 14/523,576, filed on Oct. 24, 2014, now Pat. No. 9,654,200, which is a
(Continued)

(51) Int. Cl.
*H04B 7/185* (2006.01)
*B64C 39/02* (2006.01)
(Continued)

(52) U.S. Cl.
CPC ....... *H04B 7/18504* (2013.01); *B64C 39/026* (2013.01); *B64D 47/08* (2013.01);
(Continued)

(58) Field of Classification Search
CPC .............. H04B 7/18504; B64C 39/026; B64C 2201/127; H04W 72/0446; H04W 84/18; B64D 47/08; H04L 61/6022
(Continued)

(56) References Cited

U.S. PATENT DOCUMENTS

| 4,718,005 A | 1/1988 | Feigenbaum et al. |
| 6,519,252 B2 | 2/2003 | Sallberg |
(Continued)

FOREIGN PATENT DOCUMENTS

| EP | 0 837 567 A1 | 4/1998 |
| WO | WO 00/14902 A2 | 3/2000 |

OTHER PUBLICATIONS

International Search Report and the Written Opinion of the International Searching Authority directed to related International Patent Application No. PCT/US2012/026062, dated May 24, 2012, from the European Patent Office; 9 pages.
(Continued)

*Primary Examiner* — Jaime Figueroa
(74) *Attorney, Agent, or Firm* — Sterne, Kessler, Goldstein & Fox P.L.L.C.

(57) ABSTRACT

Embodiments include a dynamic wireless aerial mesh network having aerial nodes that provides real-time persistent wide area communications service to provide communications in response to an incident. Typically, the service area is a wide area that is physically inaccessible via ground transportation. In addition, embodiments include the formation of a decentralized mesh supernetwork comprising two or more dynamic wireless aerial mesh networks where each dynamic wireless aerial mesh network is owned by a different agency (e.g., a secure community). A member of a first dynamic wireless aerial mesh network may send a request to a member of a second dynamic wireless aerial mesh network for the first dynamic wireless aerial mesh network to join the second dynamic wireless aerial mesh network to form a mesh supernetwork, and receive an acceptance from the member of the second dynamic wireless aerial mesh network.

30 Claims, 21 Drawing Sheets

Related U.S. Application Data continuation-in-part of application No. 13/800,727, filed on Mar. 13, 2013, now Pat. No. 9,871,767, which is a continuation-in-part of application No. 13/685,498, filed on Nov. 26, 2012, now Pat. No. 8,929,851, which is a continuation-in-part of application No. 12/651,794, filed on Jan. 4, 2010, now Pat. No. 8,320,874, which is a continuation of application No. 11/488,409, filed on Jul. 18, 2006, now Pat. No. 7,643,445.

(60) Provisional application No. 60/595,578, filed on Jul. 18, 2005.

(51) Int. Cl.
*H04W 72/04* (2009.01)
*H04W 84/18* (2009.01)
*B64D 47/08* (2006.01)
*H04L 29/12* (2006.01)

(52) U.S. Cl.
CPC ... *H04W 72/0446* (2013.01); *B64C 2201/127* (2013.01); *H04L 61/6022* (2013.01); *H04W 84/18* (2013.01)

(58) Field of Classification Search
USPC .................................................. 701/1, 2, 3
See application file for complete search history.

(56) References Cited

U.S. PATENT DOCUMENTS

| | | |
|---|---|---|
| 6,859,448 B1 | 2/2005 | Roy |
| 6,889,321 B1 | 5/2005 | Kung et al. |
| 6,968,187 B1 | 11/2005 | Irwin et al. |
| 7,035,773 B2 | 4/2006 | Keyes, IV et al. |
| 7,076,249 B2 | 7/2006 | Svedevall et al. |
| 7,453,837 B2 | 11/2008 | Jiang et al. |
| 7,483,416 B2 | 1/2009 | Olivier et al. |
| 7,643,445 B2 | 1/2010 | Mills et al. |
| 7,660,990 B1 | 2/2010 | Thomsen et al. |
| 7,739,728 B1 | 6/2010 | Koehler, Jr. et al. |
| 7,747,778 B1 | 6/2010 | King et al. |
| 8,185,101 B1 | 5/2012 | Wiseman et al. |
| 8,194,573 B1 * | 6/2012 | Smith ............ H04W 8/005 370/255 |
| 8,320,874 B2 | 11/2012 | Mills et al. |
| 8,364,153 B2 | 1/2013 | Boucher et al. |
| 8,811,940 B2 | 8/2014 | Boucher et al. |
| 8,897,770 B1 * | 11/2014 | Frolov ............ H04B 7/18504 244/25 |
| 8,929,851 B2 | 1/2015 | Mills et al. |
| 9,014,957 B2 | 4/2015 | Bonawitz et al. |
| 9,083,425 B1 | 7/2015 | Frolov et al. |
| 2002/0102999 A1 | 8/2002 | Maggenti et al. |
| 2002/0169954 A1 | 11/2002 | Bandini et al. |
| 2003/0105957 A1 | 6/2003 | Brabson et al. |
| 2003/0131232 A1 | 7/2003 | Fraser et al. |
| 2003/0220977 A1 | 11/2003 | Malik |
| 2004/0125802 A1 | 7/2004 | Lillie et al. |
| 2004/0172550 A1 | 9/2004 | Sai |
| 2005/0079853 A1 | 4/2005 | Hurtta |
| 2005/0170808 A1 | 8/2005 | Hamilton |
| 2005/0203873 A1 | 9/2005 | McDonald |
| 2005/0250491 A1 | 11/2005 | Roy |
| 2006/0020787 A1 | 1/2006 | Choyi et al. |
| 2006/0023654 A1 | 2/2006 | Koren et al. |
| 2006/0046697 A1 | 3/2006 | Koren et al. |
| 2006/0052113 A1 | 3/2006 | Ophir et al. |
| 2006/0053290 A1 | 3/2006 | Randle et al. |
| 2006/0158329 A1 | 7/2006 | Burkley et al. |
| 2006/0182131 A1 | 8/2006 | Dziekan, Jr. |
| 2007/0010275 A1 | 1/2007 | Kiss |
| 2007/0022470 A1 | 1/2007 | Yang |
| 2007/0060144 A1 | 3/2007 | Mills et al. |
| 2007/0103292 A1 | 5/2007 | Burkley et al. |
| 2007/0184814 A1 | 8/2007 | Hamilton |
| 2007/0198837 A1 | 8/2007 | Koodli et al. |
| 2008/0144525 A1 | 6/2008 | Crockett et al. |
| 2008/0181145 A1 | 7/2008 | Chowdhury et al. |
| 2009/0019170 A1 | 1/2009 | Wyss et al. |
| 2009/0036214 A1 | 2/2009 | Dahl |
| 2009/0207852 A1 | 8/2009 | Greene et al. |
| 2010/0095127 A1 | 4/2010 | Banerjee et al. |
| 2010/0146582 A1 | 6/2010 | Jaber et al. |
| 2010/0159976 A1 | 6/2010 | Marocchi et al. |
| 2010/0163621 A1 * | 7/2010 | Ben-Asher .......... G05D 1/0088 235/412 |
| 2010/0261427 A1 | 10/2010 | Mills et al. |
| 2010/0263025 A1 | 10/2010 | Neitzel et al. |
| 2010/0306817 A1 | 12/2010 | Grebenik et al. |
| 2011/0144828 A1 | 6/2011 | Chengalva |
| 2011/0299685 A1 | 12/2011 | Hall |
| 2012/0040635 A1 | 2/2012 | Boucher et al. |
| 2012/0233334 A1 | 9/2012 | Braudes et al. |
| 2012/0265867 A1 | 10/2012 | Boucher et al. |
| 2013/0177321 A1 | 7/2013 | Devaul et al. |
| 2013/0198517 A1 | 8/2013 | Mazzarella |
| 2013/0331139 A1 | 12/2013 | Mills et al. |
| 2014/0018976 A1 | 1/2014 | Goossen |
| 2014/0195150 A1 * | 7/2014 | Rios ................... B64C 39/024 701/469 |
| 2014/0236388 A1 | 8/2014 | Wong et al. |
| 2014/0241239 A1 * | 8/2014 | Chang ............... H04B 7/18506 370/316 |
| 2014/0249693 A1 | 9/2014 | Stark et al. |
| 2014/0316616 A1 | 10/2014 | Kugelmass |
| 2015/0063202 A1 | 3/2015 | Mazzarella |
| 2015/0268337 A1 | 9/2015 | Moe et al. |

OTHER PUBLICATIONS

International Preliminary Report on Patentability and Written Opinion of the International Searching Authority directed to related International Patent Application No. PCT/US2012/026062, dated Sep. 6, 2013; 8 pages.

International Search Report and Written Opinion of the International Searching Authority directed to related International Patent Application No. PCT/US2014/026672, dated Dec. 22, 2014; 19 pages.

Zao, J., et al., "Domain Based Internet Security Policy Management," Proceedings of DARPA Information Survivability Conference and Exposition (DISCE X '00), vol. 1, Jan. 2000; pp. 41-53.

Non-Final Rejection dated Jun. 2, 2009 for U.S. Appl. No. 11/488,409, filed Jul. 18, 2006; 11 pages.

Notice of Allowance dated Nov. 9, 2009 for U.S. Appl. No. 11/488,409, filed Jul. 18, 2006; 6 pages.

Non-Final Rejection dated Sep. 17, 2010 for U.S. Appl. No. 12/651,794, filed Jan. 4, 2010; 8 pages.

Final Rejection dated Jan. 31, 2011 for U.S. Appl. No. 12/651,794, filed Jan. 4, 2010; 9 pages.

Non-Final Rejection dated Mar. 8, 2012 for U.S. Appl. No. 12/651,794, filed Jan. 4, 2010; 5 pages.

Notice of Allowance dated Aug. 1, 2012 for U.S. Appl. No. 12/651,794, filed Jan. 4, 2010; 7 pages.

Non-Final Rejection dated Dec. 27, 2013 for U.S. Appl. No. 13/685,498, filed Nov. 26, 2012; 11 pages.

Final Rejection dated Jun. 23, 2014 for U.S. Appl. No. 13/685,498, filed Nov. 26, 2012; 6 pages.

Notice of Allowance dated Sep. 3, 2014 for U.S. Appl. No. 13/685,498, filed Nov. 26, 2012; 7 pages.

Non-Final Rejection dated Mar. 22, 2012 for U.S. Appl. No. 12/856,383, filed Aug. 13, 2010; 6 pages.

Notice of Allowance dated Oct. 1, 2012 for U.S. Appl. No. 12/856,383, filed Aug. 13, 2010; 9 pages.

Non-Final Rejection dated May 24, 2013 for U.S. Appl. No. 13/402,505, filed Feb. 22, 2012; 9 pages.

Final Rejection dated Aug. 1, 2013 for U.S. Appl. No. 13/402,505, filed Feb. 22, 2012; 9 pages.

(56) References Cited

OTHER PUBLICATIONS

Notice of Allowance dated Mar. 27, 2014 for U.S. Appl. No. 13/402,505, filed Feb. 22, 2012; 7 pages.
Supplemental Notice of Allowability dated Jul. 16, 2014 for U.S. Appl. No. 13/402,505, filed Feb. 22, 2012; 2 pages.
Non-Final Rejection dated Mar. 12, 2015 for U.S. Appl. No. 13/800,727, filed Mar. 13, 2013; 29 pages.
Final Rejection dated Oct. 21, 2015 for U.S. Appl. No. 13/800,727, filed Mar. 13, 2013; 30 pages.
Non-Final Rejection dated Sep. 19, 2016 for U.S. Appl. No. 13/800,727, filed Mar. 13, 2013; 37 pages.
Final Rejection dated May 3, 2017 for U.S. Appl. No. 13/800,727, filed Mar. 13, 2013; 43 pages.
Non-Final Rejection dated May 5, 2016 for U.S. Appl. No. 14/523,576, filed Oct. 24, 2014; 16 pages.
Notice of Allowance dated Jan. 5, 2017 for U.S. Appl. No. 14/523,576, filed Oct. 24, 2014; 5 pages.
Mehta et al., TDMA-Based Dual-Mode Communication for Mobile Wireless Sensor Networks, Sensors, Nov. 2012, ISSN 1424-8220; www.mdpi.com/journal/sensors, pp. 16194-16210.
Frew et ai.,Networking Issues for Small Unmanned Aircraft Systems, Springer Science+ Business Media B.V. , Jul. 2008; Journal Intelligent Robot Systems (2009) 54:21-37.
De Freitas et al., Cooperation among Wirelessly Connected Static and Mobile Sensor Nodes for Surveillance Applications, Sensors, Sep. 2013, ISSN 1424-8220 www.mdpi.com/journal/sensors, pp. 12903-12928.
Andre et al., Application-Driven Design of Aerial Communication Networks, IEEE Communications Magazine May 2014, pp. 129-137.
Sayyed et al., Dual-Stack Single-Radio Communication Architecture for UAV Acting as a Mobile Node to Collect Data in WSNs, Sensors, Sep. 2015, ISSN 1424-8220 www.mdpi.com/journal/sensors, pp. 23376-23401.
International Search Report and the Written Opinion of the International Searching Authority directed to related International Patent Application No. PCT/US2015/056147, dated Oct. 19, 2015 from the European Patent Office; 19 pages.
Maughan et. al., Internet Security Association and Key Management Protocol (ISAKMP), Nov. 1998, Network Working Group, Request for Comments: 2408 , 80 pages.
Morgenthaler, S. et al., "UAVNet: A Mobile Wireless Mesh Network Using Unmanned Aerial Vehicles," *GC'12 Workshop: The 3rd International Workshop on Wireless Networking & Control for Unmanned Autonomous Vehicles: Architectures, Protocols and Applications,* IEEE, pp. 1603-1608 (2012).
Examination Search Report, dated Jan. 22, 2018, for Canadian Patent Application No. 2,965,318, 4 pages.

\* cited by examiner

DYNAMIC WIRELESS AERIAL MESH NETWORK

CROSS REFERENCE TO RELATED APPLICATIONS

This application is a continuation of U.S. patent application Ser. No. 14/523,576, filed on Oct. 24, 2014, entitled System and Method for Dynamic Wireless Aerial Mesh Network ("'576 Application"), which is incorporated herein by reference in its entirety. The '576 Application is a continuation-in-part of U.S. patent application Ser. No. 13/800,727, filed on Mar. 13, 2013, entitled Enabling Ad Hoc Trusted Connections Among Enclaved Communication Communities ("'727 Application"), which is incorporated herein by reference in its entirety. The '727 application in turn is a continuation-in-part of U.S. patent application Ser. No. 13/685,498, filed on Nov. 26, 2012, entitled System and Method for Establishing an Incident Communications Network ("'498 Application"), which issued as U.S. Pat. No. 8,929,851 on Jan. 6, 2015, and is incorporated herein by reference in its entirety. The '498 application in turn is a continuation-in-part of U.S. patent application Ser. No. 12/651,794, filed on Jan. 4, 2010, entitled System and Method for Establishing an Incident Communications Network ("'794 Application"), which issued as U.S. Pat. No. 8,320,874 on Nov. 27, 2012, and is incorporated herein by reference in its entirety. The '794 application in turn is a continuation of U.S. patent application Ser. No. 11/488,409, filed on Jul. 18, 2006, entitled Interoperable Communications System and Method of Use ("'409 Application"), which is issued as U.S. Pat. No. 7,643,445 on Jan. 5, 2010, and is incorporated herein by reference in its entirety. The '409 Application in turn claims priority to U.S. Provisional Patent Application No. 60/595,578, filed on Jul. 18, 2005, entitled Selective Interoperability in a Communications Network, which is incorporated herein by reference in its entirety.

BACKGROUND

Field

The embodiments generally relate to electronic communications between secure communities, and more particularly, to providing a wireless aerial mesh network among secure communities, including incident communications networks.

Background

The dynamic creation and use of secure communities that include a collection of communications resources having an administrator that maintains control over a secure community have proliferated. The dynamic creation of secure communities either in response to an incident, event, or other pre-planned situation addressed the need to facilitate communications among disparate communication devices and resources.

Specifically, a plethora of disparate communications resources exist including resources using private wireless communications (e.g., public safety and first responder communications networks), public switched network communications resources, public wireless networks, networks of video surveillance devices, private security networks, and the like. Additionally, millions of consumers and public officials are now equipped with smartphone devices that include multiple communications abilities including both voice and video communications.

Often these communications resources cannot communicate to one another. For example, private wireless communication networks, such as those used by public safety or commercial users, are typically isolated from one another and often utilize different and incompatible technologies. While interoperability products are available to interconnect such diverse systems, cooperation among the entities involved is often a barrier to full implementation. Thus, prior art first responder communication systems exist wherein control of the resources of each organization coupled to the system is controlled by a central commander or controller. Each organization providing resources to the system must relinquish control of its resources to the central commander. The organization responsible for the operation of its radio system(s) may be unable or unwilling to grant control of its resources either to peer organizations or to a higher-level organization.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,811,940, entitled Dynamic Asset Marshalling Within an Incident Communications Network, issued on Aug. 19, 2014, ("'940 patent") which is also incorporated herein by reference, extends the concepts of the '445 and '874 patents. Namely, the '940 patent provides systems and methods that marshal resources into an incident communications network based on a variety of factors, such as the type of incident and the type of resource being marshaled.

U. S. Patent Publication 2013/0198517, entitled Enabling Ad Hoc Trusted Connections Among Enclaved Communication Communities, filed on Mar. 13, 2013, ("Enclaved Application") which is also incorporated herein by reference, also extends the concepts of the '445 and '874 patents. Namely, the Enclaved Application provides systems and methods for dynamic access among secure communities, such as incident communications networks, that enable communication resources of a first secure community to securely access and/or utilize communication resources within other secure communities.

Wireless Services when Site is Physically Inaccessible

In times of emergency, including both natural disasters and man-made scenarios, existing communication networks can be overwhelmed, congested and disrupted, making it impossible for first responders and emergency personnel to communicate within and beyond the impacted areas. To re-establish communications, it is common for carriers and government agencies to deploy portable wireless communications systems to the area. These portable systems, sometimes known as cellular on wheels (COWs) and system on wheels (SOWs), typically consist of a deployable mast with an antenna, a base station, a repeater and other associated switching and routing equipment that enables communication between two or more telephone end points within the affected area. Often these systems are built using an automotive vehicle that can drive to a location, unfurl the antenna mast, and sustain operations using an on-board power generator.

The general problems with COWs and SOWs are coverage and bandwidth limitations, and physical site accessibility problems. For example, in an earthquake, hurricane or flood related-emergency, the area might be physically inaccessible—driving the vehicle to the scene can be impractical or impossible. In military scenarios, the vehicle may not be able to drive to the scene in a reasonable time for operations to commence. The utility of these systems on wheels is also limited by numerous other factors, including effective RF/radio coverage area and line-of-sight. Radio coverage area is a function of many factors, including signal power, radio wave length, antenna height, ground terrain and atmospheric conditions, and often the optimal transmission and communications coverage within an impacted area cannot be attained.

To overcome such typical in-field limitations, sometimes the SOW and COW communication nodes can be supplemented with additional bubbles of coverage through the deployment of portable wireless network nodes, such mobile ad hoc network (MANET) systems and WiFi network access point deployments. MANET and other mobile ad hock portable or highly mobile wireless networks suffer from similar physical deployment/access limitations as do the COWs and SOWs, but suffer even greater RF/radio limitations due to their lower power, limited antenna heights, smaller node capacity, and other factors. In addition, these extended bubbles are often highly limited in their communication range, and typically do not reach back to the larger remote network, which is often needed to communicate between the affected site and remote facilities.

BRIEF SUMMARY OF THE INVENTION

Embodiments of the present invention provide a dynamic wireless aerial mesh network (e.g., a network on wings). Dynamic wireless aerial mesh network systems, methods and computer program product embodiments provide real-time persistent wide area communication and other services where the wide area is physically inaccessible via ground transportation. In addition, embodiments include the formation of a decentralized mesh supernetwork comprising two or more dynamic wireless aerial mesh networks where each dynamic wireless aerial mesh network is owned by a different agency (e.g., a secure community). A member of a first dynamic wireless aerial mesh network may send a request to a member of a second dynamic wireless aerial mesh network for the first dynamic wireless aerial mesh network to join the second dynamic wireless aerial mesh network to form a mesh supernetwork, and receive an acceptance from the member of the second dynamic wireless aerial mesh network.

Embodiments include a system, method, and computer medium storage for supporting dynamic wireless aerial mesh networks including receiving a wireless communication from a ground base station associated with a first agency, sending the wireless communication to an end unit radio transceiver associated with the first agency, where the sending is via a first aerial node (AN) of two or more ANs of a first dynamic wireless aerial mesh network that provides persistent wide area communications service. The wide area may be physically inaccessible via ground transportation, and a flight pattern of the two or more ANs of the first dynamic wireless aerial mesh network is adaptive. The flight pattern of the two or more ANDS includes a persistent coverage rotation cycle, where a replacement AN is scheduled to launch and land on a staggered basis based on an actual or projected flight duration time of the two or more ANs. In addition, the first AN of the two or more ANs occupies a relational position within the flight pattern. As the first AN retires, the replacement AN launches to fill the relational position within the flight pattern vacated by the first AN. Embodiments further include detecting a new AN in communications proximity, where the new AN is associated with a second agency. The first and second agencies are associated with an incident (e.g., a national emergency), where the first and second agencies communicate securely, and where an agency includes a collection of communication resources having an administrator that maintains control over the agency. Embodiments include receiving a request from the new AN to join the first dynamic wireless aerial mesh network, sending an acceptance to the new AN, and changing to a new flight path based on the addition of the new AN to the first dynamic wireless aerial mesh network.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
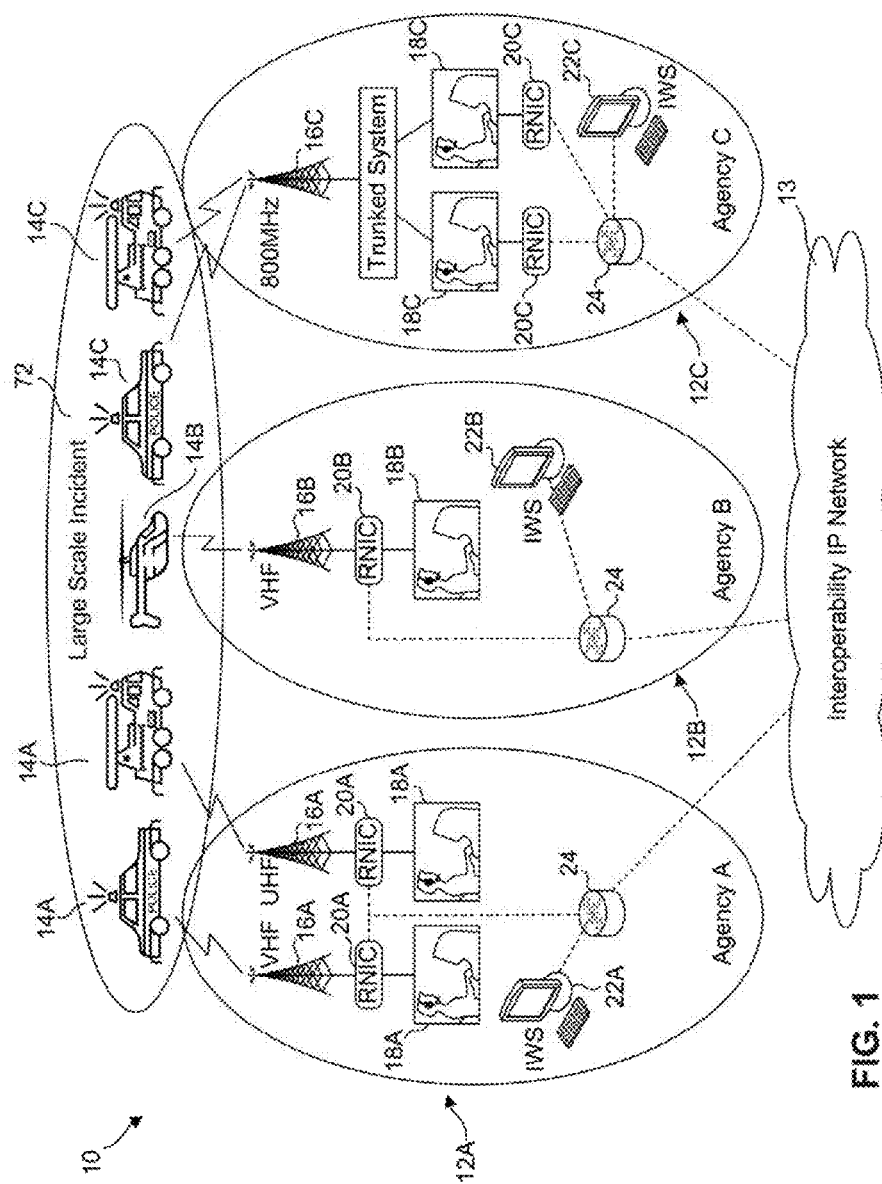
FIG. 1 is a block diagram showing an overview of one embodiment of an interoperable communications network in accordance the present invention.

As shown in FIG. 1, the present invention is directed to an interoperable communications system, hereinafter referred to as "Interop System" or an "Incident Communications Network" generally referred to by the reference numeral 10, which provides for communication between a plurality of separate radio networks 12, and/or other types of networks, such as telecommunication networks, video networks and data networks, which are not shown. In the FIG. 1 embodiment, the Interop System 10 includes the separate radio networks 12A, 12B and 12C each coupled to a common network 13 referred to as an Interoperability IP Network or hereinafter as the "Interop Network". Each radio network 12A-12C includes corresponding communication devices 14A-14C respectively, which includes mobile communication devices 14A-14C mounted in various vehicles. Although not shown, hand-held or other types of portable communications devices 14 are also often utilized in the radio networks 12. As described following, users of the communication devices 14A-14C of each radio network 12A-12C respectively can communicate to all other users of each of the radio networks 12A-12C via the Interop Network 13 in accordance with the present invention.

Each of the radio networks 12A-12C also includes typical antennas 16A-16C and base consoles 18A-18C. The radio networks 12A-12C represent typical radio networks utilizing one of various communications channels including Very High Frequency (VHF), and Ultra High Frequency (UHF), among others, which are coupled together forming the Interop System 10 in accordance with the present invention. For example, FIG. 1 includes diagrams of various typical radio networks 12 including a two-channel system 12A, a single channel system 12B, and a trunked system 12C which are each coupled to the Interop Network 13 and together form the Interop System 10 in accordance with the present invention.

Still referring to FIG. 1, the Interop System 10 includes at least one radio network interface controller 20A-20C (herein referred to as "RNIC") coupled to each of the radio networks 12A-12C respectively. Each RNIC 20A-20C is coupled to the corresponding radio network 12 as well as the common Interop Network 13 and a controller 22 identified herein as an Interoperability Work Station (IWS). Each RNIC 20 is operable in response to commands from one or more IWS controllers 22 designated as having control over the particular RNIC 20 for coupling an associated radio network 12 to the Interop Network 13 for the purpose of transmitting and receiving messages to/from each of the other radio networks coupled to the Interop Network. The two-channel radio network 12A includes two interfaces RNIC 20A one for coupling each channel of the two-channel radio network to the Interop Network 13. Still referring to the radio network 12A, each of the two RNIC 20A interfaces are coupled to and controlled by a single IWS controller 22. However, in other embodiments of the present invention, other configurations may be utilized including wherein a single RNIC 20 is configured to connect both channels of a two-channel network to the Interop Network 13 or wherein each RNIC 20A is coupled to controllable by individual IWS controllers 22.

Still referring to FIG. 1, the Interop System 10 includes a router 24 coupled between the Interop Network 13 and the RNICS 20 and IWS controllers 22 for each radio network 12 for routing messages transmitted within the Interop Network 13. Alternatively, in other embodiments of the Interop System 10, other types of data switches or hubs may also be utilized instead of the data router 24.

In a preferred embodiment, the Interop System 10 transmits messages between the multiple radio networks 12 via IP protocol over the Interop Network 13, however, the scope of the present invention is not limited in this regard as any suitable transmission protocols and corresponding network could be utilized.

Figure 2:
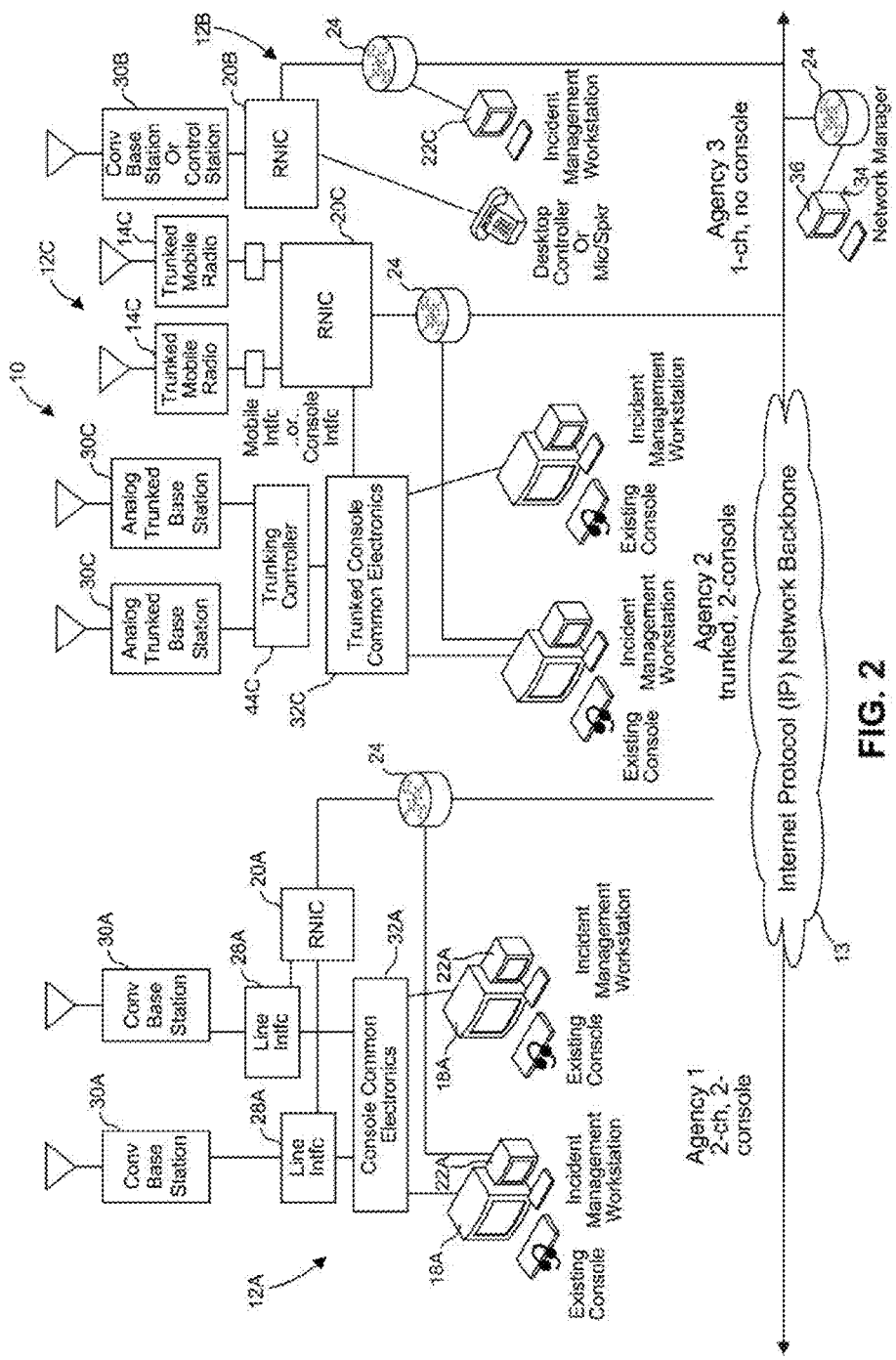
FIG. 2 is a block diagram showing another embodiment of an interoperable communications network in accordance with the present invention.

Preferably, the present invention Interop System 10 is configured as overlay architecture connectable to pre-existing radio networks 12A-12C as shown in FIG. 2. Typically, an RNIC 20 and IWS controller 22 is coupled to each existing radio network 12A-12C for connecting each radio network to the common Interop Network 13. In this embodiment, the existing radio networks 12A-12C are usually left in place for normal operation apart from the Interop System 10. Depending on the radio network 12 being coupled to the Interop Network 13, various types of line interfaces 28 are utilized for coupling the RNIC 20 to the particular radio network.

As shown in FIG. 2, the radio network 12A includes conventional base stations 30 or repeaters connected to base consoles 18A via conventional console electronics 32A. A line interface 28A is provided for coupling the RNIC 20A to the radio network 12A. Depending on the configuration of the radio network 12, the line interface 28 may include various known interfaces such as, local control interfaces (audio, push-to-talk (PTT), receiving indication), DC remote, tone remote, and ear and mouth (E & M) interfaces.

Alternatively, the RNIC 20C is connected to a trunked radio network 12C via an air interface 40C coupled to mobile radios 42C. In another embodiment, also illustrated in FIG. 2, the RNIC 20C can be coupled to the radio network 12C via typical console electronics 32C and trunking controller 44C.

Still referring to FIG. 2, the radio network 12B is coupled to the Interop Network 13 via the RNIC 20B coupled in-line in the existing radio network. Thus, the communications devices 14B are provided selective access to the Interop Network 13 via the RNIC 20B pursuant to commands from the IWS controller 22B associated with the radio network 12B or another authorized IWS controller 22.

Referring again to FIG. 2, a network administrator or manager 34 including a network server 36 may be coupled to the Interop Network 13 for carrying out administrative duties related to the Interop Network. Alternatively, in other embodiments of the Interop System 10, configuration of the network can be implemented from endpoints such as the IWS controllers 22 and RNIC 20 servers wherein a network administrative server is not required.

Figure 3:
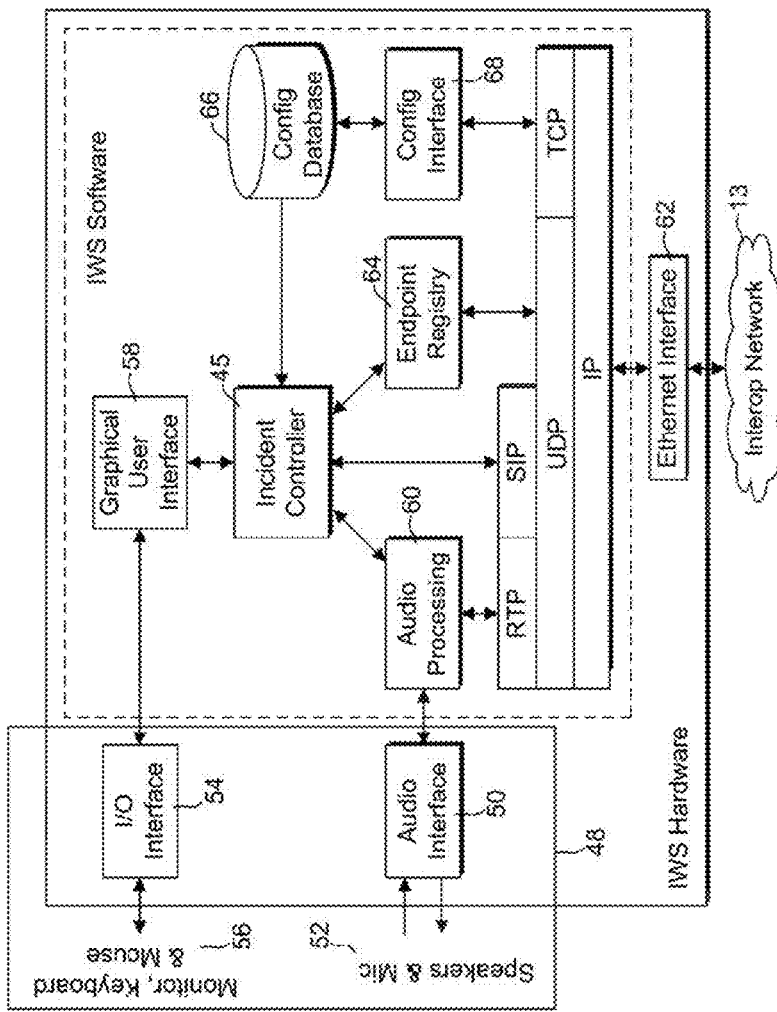
FIG. 3 is a block diagram of one embodiment of an Interoperability Workstation (IWS) controller in accordance with the present invention.

Referring now to FIGS. 1 and 3, each IWS controller 22 is coupled to the Interop Network 13 and the RNIC 20 for controlling the connection between the associated radio network 12 and the Interop Network 13. Thus, the connection between each radio network 12 and the Interop Network 13 is controlled by the IWS controller 22 associated with each radio network via the RNIC 20. This is a key feature of the present invention as control over each radio network 12 and the communication devices 14 associated therewith is maintained by an IWS controller 22 coupled thereto. As set shown in FIG. 3, the IWS controller 22 includes a computer processor identified as incident controller 45 having a user interface 48 including one or more of an audio interface 50 including a speaker and microphone 52 and an I/O interface 54 including a keyboard, mouse, monitor, joystick, etc., collectively, identified by the reference numeral 56. A graphical user interface (GUI) 58 is provided coupled to the I/O interface 54 for providing graphics based outputs to a user of the IWS controller 22 such as the GUI included in FIG. 6.

The IWS controller 22 includes an audio processor 60 coupled to the incident controller 45 and the audio interface 50 for processing audio inputs/outputs transmitted to and from the IWS controller respectively. The audio processor 60 converts data packets received by the IWS controller 22 to audio signals and outputs the same to a user of the IWS controller via the audio interface 50. Similarly, audio signals input to the IWS controller are converted by the audio processor 60 and/or the incident controller 45 and transmitted to the appropriate recipient via a network interface 62 and the Interop Network 13. In the preferred embodiment, audio signals are transmitted over the Interop Network 13 using standard RTP or SRTP as appropriate for real time transmission of audio messages, however other protocols may be utilized.

The IWS controller 22 includes an endpoint registry 64 coupled to the incident controller 45 and the network interface 62 for storing address information for all endpoints in the Interop System 10 including all RNIC 20 servers and all IWS controllers 22. Each endpoint in the Interop Network 13 periodically announces its presence to all other endpoints in the Interop Network (the preferred embodiment uses IP multicast to perform this announcement). All other endpoints that receive this announcement add the originating endpoint to their endpoint registry 64. The endpoint registry 64 allows each endpoint to communicate directly with any other endpoint in the Interop Network 13 without the need for an intervening server.

The IWS controller 22 also includes a configuration database 66 and configuration interface 68 coupled to the incident server and the Interop Network 13. The configuration database 66 is provided for storing configuration data for the IWS controller 22 as well as other IWS controllers 22 and RNIC 20 servers including public key information for each RNIC 20 and IWS controller 22 in the Interop System 10. A preferred embodiment of the Interop System 10 utilizes a public key cryptography method for encrypting messages transferred over the Interop Network 13.

Each RNIC 20 is configured with a list of IWS controllers 22 that have permission to control the operation of that RNIC which are stored in the configuration database 66 coupled to the RNIC. For security purposes, each RNIC 20 verifies that a received message is from one a trusted IWS controller 22.

For message authentication, the preferred embodiment of the Interop System 10 uses public-key cryptography as follows: Each endpoint in the system (RNIC 20 or IWS controller 22) is assigned a private key and a public key in accordance with standard key generation techniques. The private key is stored only on the endpoint associated therewith. The public key is distributed to all other endpoints in the network via the configuration interface 68. Messages from an endpoint to other endpoints are encrypted using the originating endpoint's private key. Messages received by an endpoint are decoded using the originating endpoint's public key. If this decode process is successful, the message originator and contents are securely authenticated.

The Interop System 10 provides for multiple authorized IWS controllers 22 to control a particular RNIC 20 and thereby control connection between the associated communications devices 14 and the Interop Network 13. Typically, for use during incidences involving multiple municipalities or jurisdictions, or other events, resources including radio networks 12 and the associated communication devices 14 may be shared by multiple organizations including wherein several or all of the organizations may be permitted to exercise control over the shared resources. The Interop System 10 provides for multiple organizations to control shared radio networks 12 by designating each of the IWS controller 22 for each of the multiple organizations as authorized to control the RNIC 20 associated with the shared network. Thus, the RNIC 20 is configured to include all authorized IWS controllers 22 as authorized to provide instructions to the RNIC. Although the commands are sent to the RNIC 20 as session invitations, the RNIC is configured to accept all invitations from authorized IWS controllers 22.

Figure 4:
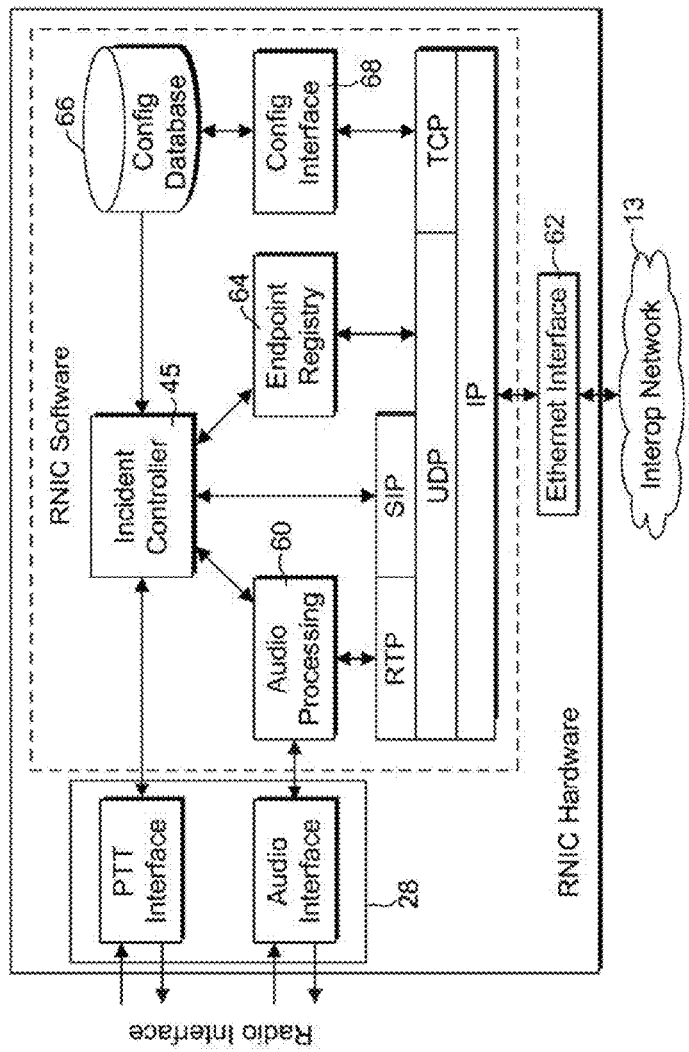
FIG. 4 is a block diagram of one embodiment of a Radio Network Interface Controller (RNIC) in accordance with the present invention.

Referring to FIG. 4, the RNIC 20 coupled to each radio network 12 includes an incident controller 45, coupled to an audio processor 60, an endpoint registry 64, a configuration database 66 and a configuration interface 68 as set forth above with respect to the IWS controller 22. The incident controller 45 is coupled to an associated radio network 12 via a radio interface 28 and the Interop Network 13 via a network interface 62.

Figure 5:
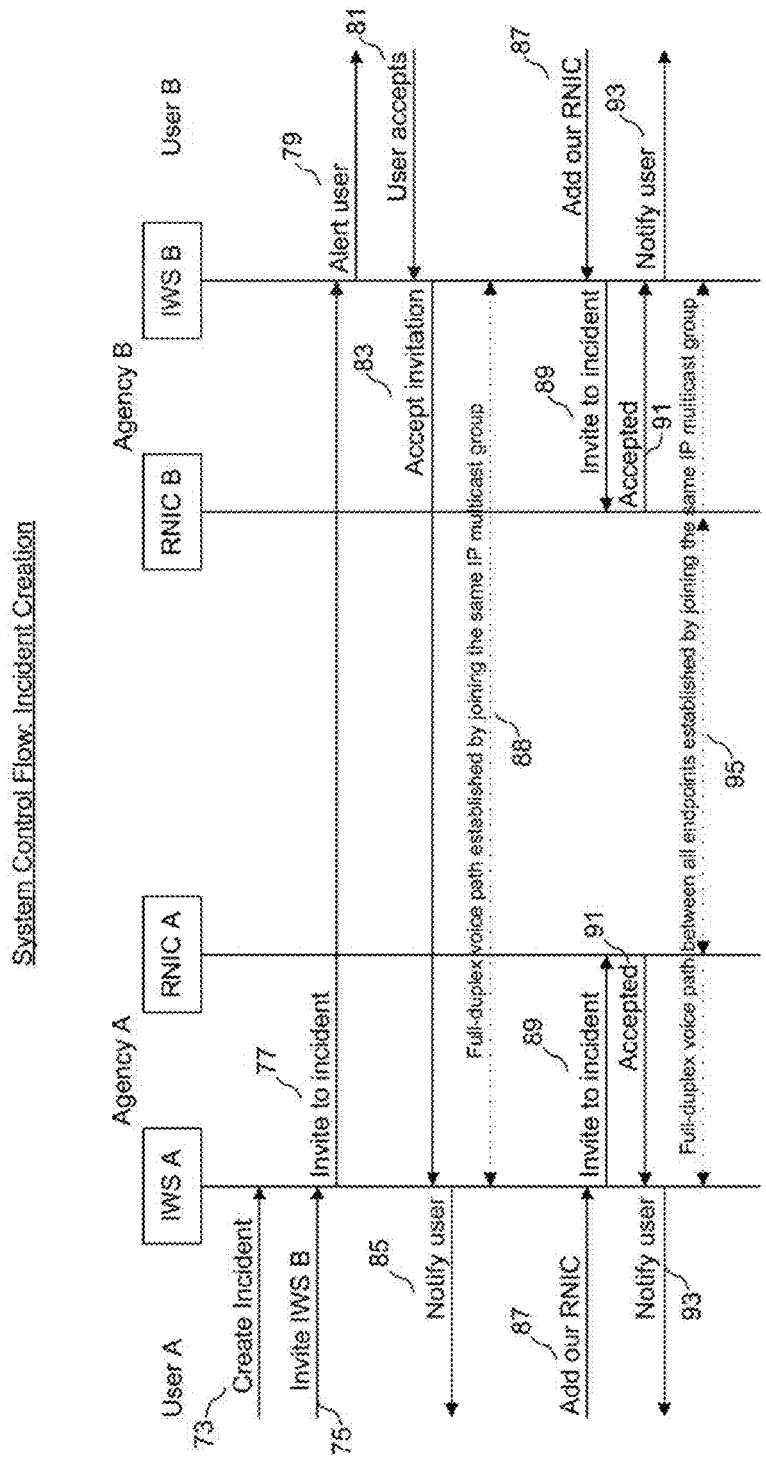
FIG. 5 is an event flow diagram showing the creation of an incident in accordance with the present invention interoperable communications network.
Figure 6:
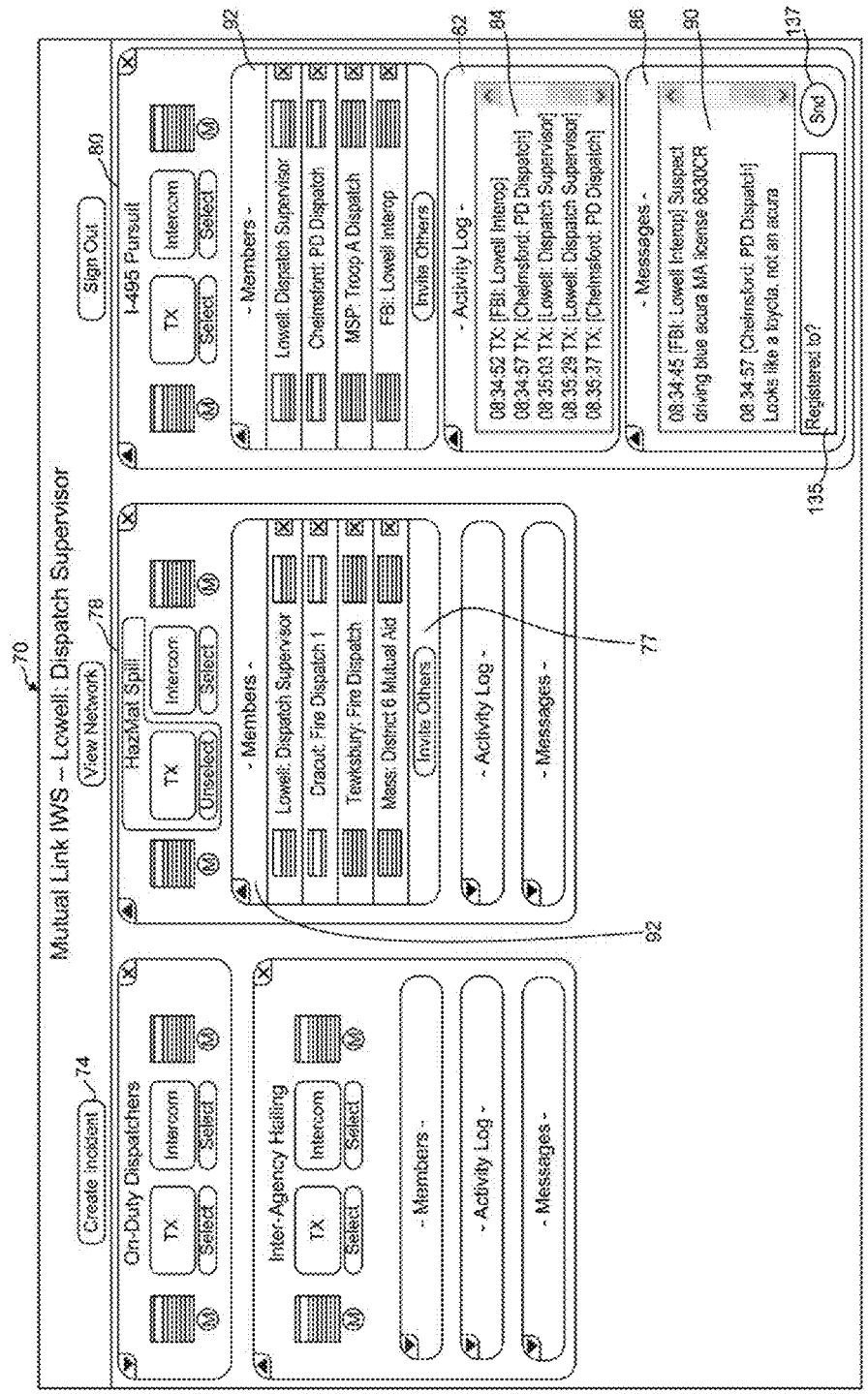
FIG. 6 is a diagram showing one embodiment of a graphical user interface (GUI) for use with an IWS of the present invention.
Figure 7:
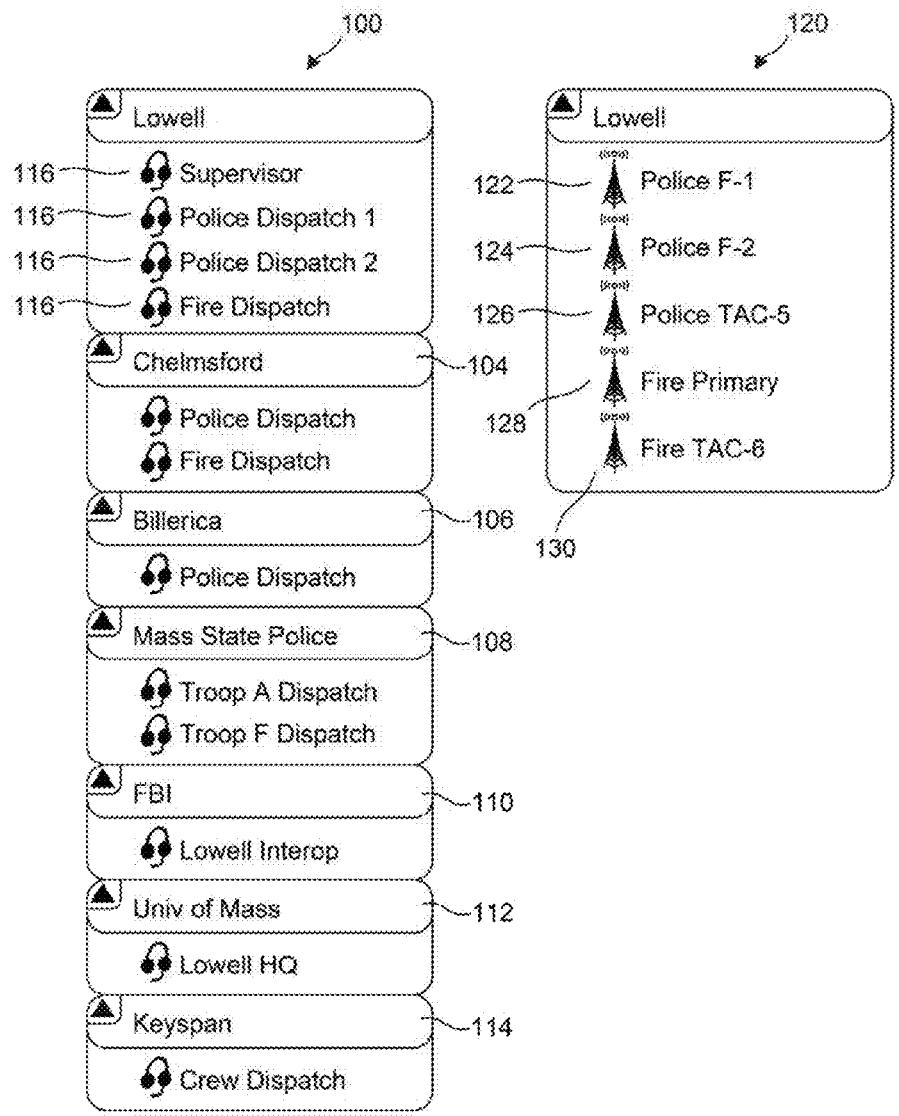
FIG. 7 is a diagram showing one embodiment of a GUI in accordance with the present invention for use with an IWS controller for contacting various other IWS controllers and networks within the system.

In operation, the IWS controller 22 creates an incident as set forth in the event flow diagram 70 of FIG. 5 and described following. An operator, User A, via an IWS controller 22 (IWS A) initiates a new incident 72 (FIG. 5, step 73) using the create incident button 74 of the GUI 76. (GUI 76 is illustrated in FIG. 6). The incident controller 45 assigns an IP address that will be used for voice communications for the incident 72 (the preferred embodiment uses an IP multicast address). If User A desires to talk to another IWS controller 22 (IWS B), he uses the GUI 76 via invitation button 77 associated with the incident 72 to select a particular IWS controller 22 to invite to participate in the incident 72 (FIG. 5, step 75). A GUI 100 (FIG. 7) is utilized by an IWS controller 22 for selection of another IWS controller to invite to an incident 72 or peer-to-peer talk group. In the FIG. 7 embodiment, each agency having IWS controllers 22 available on the Interop System 10 is identified on the GUI 100 (i.e., Lowell—102; Chelmsford—104; Billerica—106; Massachusetts State Police—108; FBI—110; University of Massachusetts—112; Keyspan—114.)

The user of an IWS controller can select one or more IWS controllers 22 using the icons 116 identifying each IWS controller available. In this example, selecting the IWS B causes the incident controller 45 to look up and retrieve the address of IWS B in the endpoint registry 64. The incident controller 45 then sends an invitation to the particular IWS controller 22 selected using the Interop Network 13 (FIG. 5, step 77).

The incident controller on IWS B receives the invitation and provides a notification to the User B as to the invitation (FIG. 5, step 79). The User B may then accept or decline the invitation. Per the FIG. 5 example, User B accepts the invitation at step 81. Upon User B acceptance of the invitation, the incident controller 45 (of IWS B) sends an acceptance message to IWS A (FIG. 5, step 83) and the user thereof (User A) is alerted of the acceptance of User B at step 85.

Thereafter, the incident controllers 45 of both IWS A and IWS B direct their respective audio processors 60 to start a bidirectional audio stream as follows: Audio input from the IWS microphone 52 is converted to data packets (the preferred embodiment uses standard RTP or SRTP as appropriate) and is transmitted to the IP address assigned to the incident. This transmission may optionally be enabled by pressing a PTT (Push-To-Talk) button and disabled by the release of this button. Data packets received on the assigned IP address are converted to audio and sent to the IWS speakers 52. Thus, User A and User B are now engaged in a full-duplex voice conversation via their respective IWS controllers 22 (FIG. 5, event 88).

A preferred embodiment of the Interop System 10 uses the standard SIP protocol with message encryption to transmit messages over the Interop Network 13. However, the routing of information/data over the Interop Network 13 can be via any suitable protocol thus, the scope of the Interop System is not limited with respect to a particular data transmission protocol.

Still Referring to FIG. 5, following acceptance of an invitation to allocate its radio network 12 and associated communications devices 14, each IWS controller 22 must issue appropriate commands to the RNIC 20 coupled to the designated radio network to connect the same to the Interop Network 13. Thus, each IWS user (FIG. 5, User A and User B) intends to allocate an RNIC 20 under their control (e.g. RNIC A and RNIC B respectively) to participate in the incident. The operator of each IWS controller 22 then uses a GUI such as the GUI 120, shown in FIG. 7, to select an RNIC 20 (and associated radio network 12) allocated for the incident and for which the IWS controller 22 is authorized to control (FIG. 5, step 87). For example, the GUI 120 for Lowell (Lowell, Mass.) identifies an RNIC 20 for each of a Police F1—122; Police F2—124; Police TAC-5—126; Fire Primary—128; and Fire TAC-6—130. As indicated in the FIG. 7 example, the Lowell GUI 120 indicates only RNICs 20 for which the IWS controller 22 is authorized to control. Thus, the RNICs associated with other agencies do not appear on the GUI 120 of the IWS controllers 22 associated with the Lowell agencies.

As set forth above, each incident 72 created includes a separate IP address designated for that incident. Thus, if multiple incidents occur simultaneously wherein the same organizations are invited to couple their resources to the Interop Network 13, the audio transmissions are communicated to the radio networks 12 via the separate IP addresses for each incident 72. Accordingly the endpoint group for one incident 72 may include some common resources such as the IWS controllers 22 as well as various different or common RNICs 20 and associated radio networks 12.

As further shown in FIG. 5, the incident controller 45 for each IWS controller 22 then looks up and retrieves the IP address of the RNIC 20 to be coupled to the Interop Network 13 in the endpoint registry 64. The IWS controller 22 and/or incident controller 45 (FIG. 5, IWS A and IWS B) then sends an invitation to the retrieved address of the RNIC 20 using the Interop Network 13. (FIG. 5, step 89). As set forth above, the preferred embodiment uses the standard SIP protocol with message encryption. The incident controller 45 on the designated RNIC 20 receives the invitation and verifies (via the public keys stored in the configuration database 66) that the invitation is from an IWS controller 22 that has permission to control that RNIC. If verified, the RNIC 20 accepts the invitation, which causes the incident controller to send an acceptance message to the inviting IWS controller. (FIG. 5, step 91). The user of the IWS controller is notified of the acceptance by the RNIC 20 at step 93.

To complete the coupling of the allocated radio network 12 to the Interop Network 13, the incident controller 45 on the RNIC 20 directs the audio processor 60 to start a bidirectional audio stream as follows: Audio input from the connected resource (i.e., radio network 12) is converted to data packets (the preferred embodiment uses standard RTP or SRTP as appropriate) and is transmitted to the IP address assigned to the incident 72. This transmission may optionally be gated by either an "audio present" control signal from the resource, or by the audio processor 60 detecting that a sufficient audio signal is present. Data packets received on the assigned IP address are converted to audio and sent to the connected resource i.e., radio network 12 and thereby the associated communication devices 14). While such audio is being sent, the RNIC 20 will output an "audio present" control signal for use by the radio network 12. Still referring to the FIG. 5 example, all four endpoints (IWS A, IWS B, RNIC A, RNIC B) are thereby engaged in a full-duplex voice conversation which is established by joining the same in an IP multicast group (FIG. 5, event 95). Thus, any audio sent by one of the endpoints is received by all of the other endpoints.

Referring again to FIG. 6, the GUI 70 displays an activity log 82 including displaying a chronological listing 84 of the communications of each communications device 14 coupled to the incident 72. Additionally, a message window 86 on GUI 70 displays text messages conveyed between IWS controllers 22 associated with an incident 72. The message window 86 implements a text-messaging (or instant messaging) capability between the IWS controllers 22 participating in an incident 72. Operators of the IWS controllers 22 enter a message in the bottom window 135 then click the send button 137; The message is then sent to all other IWS controllers 22 which are currently members of the incident 72 and appears in the message window 86 of each of these IWS controllers. As shown in FIG. 6, identification headings as to the source of the messages are appended to the displayed listing 84 and the transcriptions 90 to identify the source of the transmission. This is one example of how the Interop System 10 provides more than just voice interoperability between discrete systems.

Still referring to FIG. 6, the GUI 70 also includes a member listing 92 for each incident 72 that identifies each organization or radio network 12 which have authorized coupling its associated radio network to the Interop Network 13 for the particular incident. Thus, the IWS controller 22 has a visual display showing all organizations and associated radio networks 12 coupled to the Interop Network 13 for each incident.

At any time during or following the completion of an incident 72, an IWS controller 22 via a user thereof may terminate the coupling between an associated radio network 12 for which the IWS controller is authorized to control and the Interop Network 13.

Accordingly, each IWS controller 22 communicates with other IWS controllers and RNIC 20 servers as peer-to-peer nodes in the Interop Network 13. Additionally, each RNIC 20 operates in response to commands from an authorized IWS controller. Incident communications are transmitted to all IWS controllers 22 and RNIC 20 servers coupled to an incident 72 using peer-to-peer multicast transmissions. Accordingly, each RNIC 20 and associated radio network 12 is coupled to the Interop Network 13 pursuant to commands from an authorized IWS controller 22. Thus, control of each radio network 12 is maintained by an IWS controller 22 associated therewith.

Although, the above-identified embodiment of the invention illustrates a system and method for coupling a plurality of radio networks 12 to the Interop Network 13, the present invention is not limited in this regard as other types of communications systems and networks can also be coupled to an Interop Network 13 in accordance with the present invention. For example, a public address system (e.g., the public address system in a high school or college campus) can be coupled to the Interop Network 13 via an RNIC 20 server and appropriate interface such that agencies such as police or fire organizations can directly operate and communicate over the public address system via the Interop Network 13. Thus, any type of discrete communications system can be coupled to the Interop System in accordance with the present invention via an RNIC 20 and appropriate interface.

Further, it is not required that the RNIC 20 and IWS controller 22 reside on separate servers, thus the Interop system 10 disclosed can be integrated directly into dispatch consoles present in an existing system. Alternatively, the interop system disclosed can be integrated directly into a computer-aided dispatch (CAD) system.

Additionally, the Interop system of the present invention can be used to permit discrete organizations, and the computer networks associated therewith, to be accessible to otherwise disjunct agencies or networks. For example, the present invention Interop System 10 can be utilized to provide police unit field units access to data facilities residing on a database coupled to an otherwise disjunct network, such as a crime database or floor plan of a building. Thus, the disclosed system can be used to selectively grant access to data sources, such as a database.

Another example of resources which are connectable to an Interop System of the present invention are video systems including video cameras, such as surveillance or in-vehicle cameras wherein access to the video data captured thereby is selectively provided to other users of the Interop system.

As set forth above, many other types of communications devices can be coupled to an Interop System in accordance with the present invention wherein selective access to certain resources is provided to other organizations and users thereof coupled to the system. Access is granted and controlled only by authorized controllers associated with the resources.

Further, a pre-planned ("storm plan") can be developed to facilitate rapid setup of an incident configuration in accordance with the present invention system. Also, the disclosed system can provide communications among a defined subset of members (such as certain IWS controllers only, permitting dispatchers to "conference" off-the-air with respect to an incident group).

Figure 8:
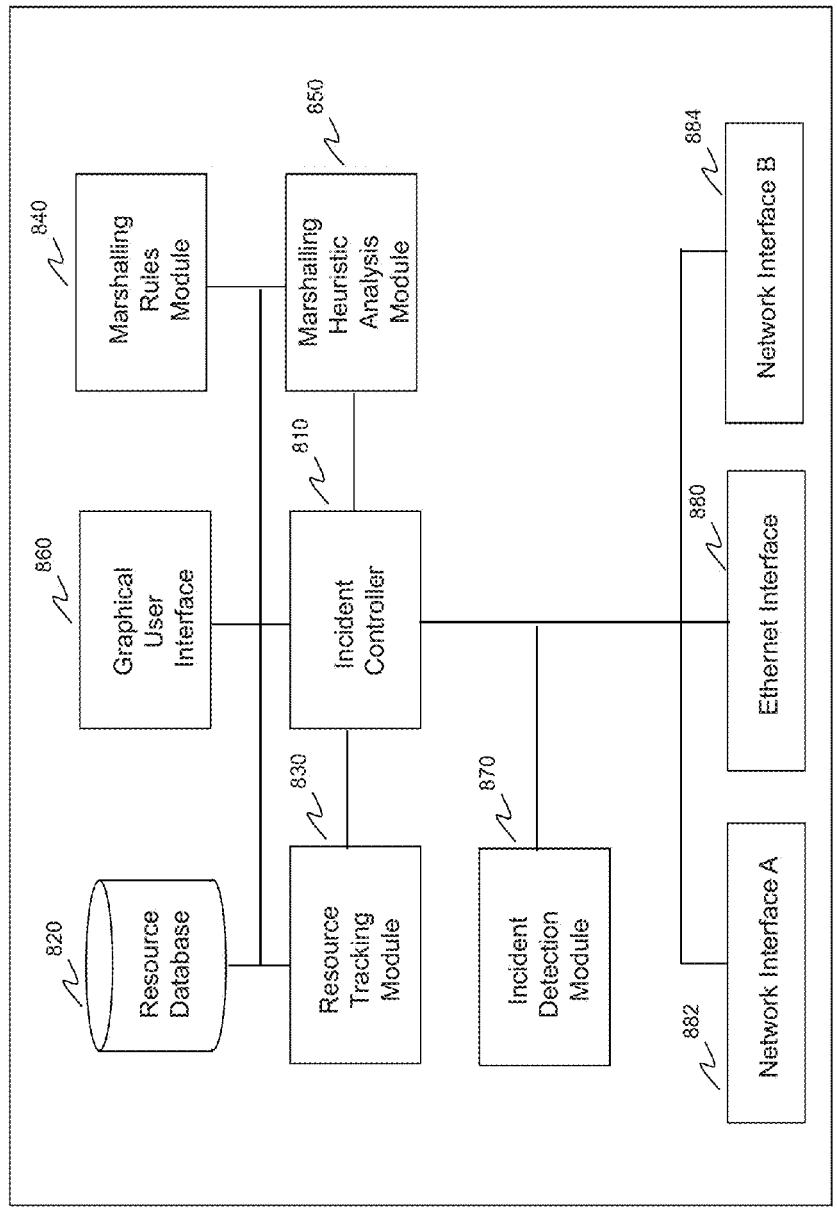
FIG. 8 is a block diagram of a system for establishing an incident communications network, according to an embodiment of the invention.

In a further embodiment, a system for establishing an incident communications network that enables interoperable communications among communications resources controlled by multiple parties during an incident involving emergency or pre-planned multi-party communications is provided that includes a marshalling rules module coupled to the incident controller that stores a set of rules, such that each rule identifies how to select the communications resources to be marshaled into an incident communications network based on an incident trigger. FIG. 8 provides a block diagram of an incident communications network system 800, according to an embodiment of the invention.

Incident communications network system 800 includes incident controller 810, resource database 820, resource tracking module 830, marshalling rules module 840, marshalling heuristic analysis module 850, graphical user interface 860 and incident detection module 870. Additionally, incident communications network system 800 includes a variety of network interfaces, including Ethernet interface 880, network interface A 882 and network interface B 884. Network interface A 882 and network interface B 884 support either wireless or wireline network interfaces and a variety of networking protocols.

Incident controller 810 includes the capabilities discussed above with respect to controller 22, and other capabilities enabling it to communicate and control resource database 820, resource tracking module 830, marshalling rules module 840, marshalling heuristic analysis module 850, graphical user interface 860 and incident detection module 870. Upon receipt of an incident trigger, incident controller 810 is configured to establish an incident communications network. Incident controller 810 obtains a marshalling rule from marshalling rules module 840 based on the received information and the determined incident trigger. Incident controller 819 then marshals communications resources based on the marshalling rule accessed from marshalling rules module 840 and the communications resources determined to be available within communications resource database 820. Communications resources are marshaled inviting the identified communications resources to participate in the incident communications network.

Communications resource database 820 is coupled to incident controller 810 and stores communications resources information. Communications resources information includes for each communications resources any combination of a unique resource identifier, a unique combination of identifiers, a resource type, an organization, a jurisdiction, an administrator, a geographic location indicator, a time-proximity indicator, a status and alternative means to communicate with the communications resource or administrator controlling the communications resource.

A unique resource identifier may be any type of descriptor that uniquely identifies a resource. The resource type identifies the type of device, e.g., video camera, cellular phone, smartphone and specifies the communications characteristics of the resource (e.g., screen size, communications protocol, bandwidth, etc.) The organization identifies the type of organization that the resource is associated with, such as, for example, police, fire, private security company and the like. The jurisdiction identifies the jurisdiction associated with the device, such as, for example, District of Columbia, Fairfax county, Montgomery county, etc. The time-proximity indicator indicates the time needed for a communications resource to be located to the area in the proximity of the incident detected. The administrator identifies an individual or device responsible for administrating the communications resource. The status identifies whether the communications resource is available. The alternative means of communicating with a communications resource includes, for example, a telephone number for an administrator that serves as the second contact means, where the first contact means may be an email address or IP address.

Resource tracking module 830 is coupled to communications resource database 820 and tracks the availability of communications resources. Resource tracking module 830 transmits requests to communications resources to confirm availability of communications resources. In an embodiment, the frequency of requests is based on the relative importance of the communications resources. In another embodiment, resource tracking module 820 receives status messages from communications resources that provide an availability of the communications resource. Resource tracking module 830 also is configured to generate alerts when a specified communications resource is unavailable.

Marshalling rules module 840 is coupled to incident controller 810 and stores a set of marshalling rules. A marshalling rule identifies how to select the communications resources to be marshaled into an incident communications network based on an incident trigger. The marshalling rules can consider a variety of factors to determine whether to marshal a communications resource into an incident communications network. For example, a rule within the set of marshalling rules includes the geographical proximity and/or time proximity to the incident in which communications resources should be marshaled. Another rule with the set of marshalling rules includes an importance of a communications resource to be marshaled into the incident communications network. As another example of a rule, a rule specifies whether communications resources should be marshaled into or removed from the incident communications network as incident conditions evolve. Marshalling rules are developed as a function of the type of incident trigger.

For example, if an incident trigger includes a gunshot determined to have originated from college campus, the marshalling rule may include inviting county police, campus police, emergency medical personnel and video cameras on the campus near the location of the gunshot into the incident communications network.

In alternative embodiments, marshalling rules module 840 includes one or more algorithms that dynamically generate the communications resources that should be marshalled into the incident communications network based upon incident conditions, available communications resources, and historical pattern analysis that examine previous incident conditions that are similar to the present conditions to evaluate what resources would be most useful to invite into the incident communications network. The historical pattern analysis looks at activity levels and past performance of communications resources to assist in making decisions on what resources to invite.

In embodiments, two or more administrators may review marshalling rules via a graphical user interface, such as graphical user interface 860. Graphical user interface 860 is configured to display rules and enable real time modification based on inputs from one or more administrator. The rules may be adjust to configures resources for auto-inclusion or request for inclusion, or the right to allow other party's to take control of or share control of a communications resource. Within marshalling rules, the rules identify who will control the communications resources, among the other rules characteristics Incident controller 810 marshals communications resources based on marshalling rules, but also based on the availability of resources as tracked by resource tracking module 830. Incident control 810 marshals communications resources in order of priority and/or availability as specified in marshalling rules, in substitution of an initially specified communications resource or other substitute communications resources when a substitute communications resource is unavailable based on tracking information from resource tracking module 830.

Rules within marshalling rules module 840 also can include a multivariate set of marshalling rules, such that communications resources may be marshaled based upon an identify, geographic proximity or other logical relation of communications resources to other available communications resources marshaled into the incident communications network. For example, a multivariate set of marshalling rules includes, for example, marshalling video resources in proximity to a location of a chemical, biological, radiological or nuclear sensor generating alert.

Marshalling heuristic analysis module 850 is coupled to marshalling rules module 850 and incident controller 810. Marshalling heuristic analysis module 850 monitors incident communications network interactions to heuristically improve marshalling rules. Marshalling heuristic analysis module 850 is configured to enable parties that participated in the incident communications network to rate the value of the communications resources within the incident communications network. Additionally, marshalling heuristic analysis module 850 generates an activity, rating and/or performance metrics for each communications resource involved in the incident communications network. In an embodiment, marshalling heuristic analysis module 850 modifies one or more marshalling rules based on the activity and performance metrics.

Alternatively rules within marshalling rules module 840 can factor in a value rating of a communications resources based on past activities recorded by marshalling heuristic analysis module 850 that are used to determine whether to marshal a communications resources into an incident communications network.

Graphical user interface 860 is coupled to the incident controller. Graphical user interface 860 is configured to display an incident geographical map around the location of an incident that identifies the location and availability of communications resources.

In an embodiment, upon receiving a request for information about a communications resource displayed on the incident geographical map, graphical user interface 860 is configured to display details regarding the communications resources. Additionally, in embodiments an incident geographical map displays communications resources, which are not part of the incident communications network, and organizes the communications resources into groupings based on common characteristics. The common characteristics include, for example, type, organization, location, and/or jurisdiction. In embodiments, incident controller 810 invites or removes communications resources from the incident communications network based on inputs received through graphical user interface 860. That is, a user may select an icon on the display to be removed or added to an incident communications network. In response to such an input received by graphical user interface 860, incident controller 810 takes an appropriate action to add or remove a communications resource.

Incident detection module 870 is coupled to incident controller 810 and is configured to receive and analyze information sources to determine incident triggers. Information sources include traffic reports, transportation reports (e.g., intelligent highway information reports, such as vehicle speed and/or highway closures), police reports, fire reports, missing person reports, security alarms, national weather service alerts, 911 call information, gunshot alerts, video surveillance video streams, video analytics system reports (e.g., advanced video systems to determine suspicious events using, for example, facial recognition), communications resources alert messages, law enforcement and public safety intelligence reports (e.g., intelligence reports generated by fusion centers or homeland security centers), damage assessment reports (e.g., in the event of a hurricane, a government agency may generate reports that can be used to deploy the appropriate resources), medical assessment and capacity reports, equipment availability status, public danger alerts, Internet social media feeds, RFID sensors alerts, geographic location or position reports (e.g., tracking the location of the geographic position of a set of trucks to determine positioning capabilities), hazardous material reports, border or trip sensor reports, environmental monitor reports, mechanical or electromechanical system status reports, human and/or machine based pattern recognition or detection system reports, keyword or concept mined reports derived from other source documents or data, personnel life support systems reports and physiological sensor reports.

Figure 9:
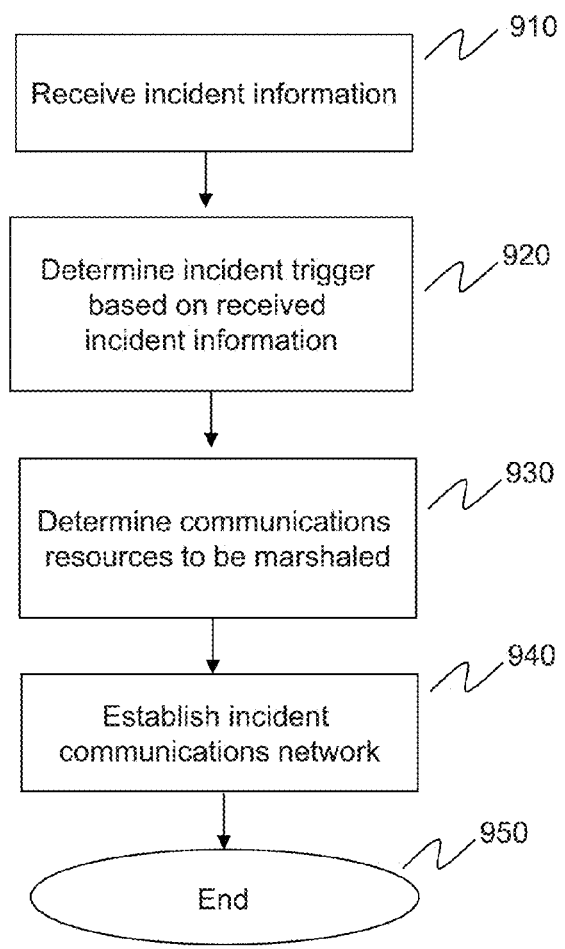
FIG. 9 is a flowchart of a method for establishing an incident communications network, according to an embodiment of the invention.

FIG. 9 provides a method 900 for establishing an incident communications network by determining an incident trigger and marshalling communications resources based on the incident trigger, according to an embodiment of the invention.

Method 900 begins in step 910. In step 910, information from an information source is received. For example, information is received by incident detection module 870. Information sources include, but are not limited to, traffic reports, transportation reports (e.g., intelligent highway information reports, such as vehicle speed and/or highway closures), police reports, fire reports, missing person reports, security alarms, national weather service alerts, 911 call information, gunshot alerts, video surveillance video streams, video analytics system reports (e.g., advanced video systems to determine suspicious events using, for example, facial recognition), communications resources alert messages, law enforcement and public safety intelligence reports (e.g., intelligence reports generated by fusion centers or homeland security centers), damage assessment reports (e.g., in the event of a hurricane, a government agency may generate reports that can be used to deploy the appropriate resources), medical assessment and capacity reports, equipment availability status, public danger alerts, Internet social media feeds, RFID sensors alerts, geographic location or position reports (e.g., tracking the location of the geographic position of a set of trucks to determine positioning capabilities), hazardous material reports, border or trip sensor reports, environmental monitor reports, mechanical or electromechanical system status reports, human and/or machine based pattern recognition or detection system reports, keyword or concept mined reports derived from other source documents or data, personnel life support systems reports and physiological sensor reports.

In step 920 an incident trigger is determined. The information received in step 920 is analyzed to determine whether an incident exists. Information may include information that specifies a type of event (e.g., an alert of a natural disaster or terrorist event) or information that must be analyzed to determine whether an incident exists (e.g., keyword or concepts mined reports derived from source documents that may determine an event or incident is likely to happen).

In step 930 communications resources to be marshalled into the incident communications network based on the incident trigger are determined. The communications resources to be invited to participate in the incident communications network are determined based on the application of one or more marshalling rules that are stored, for example, in marshalling rules module 840. The rule or rules to be applied are based on the determined incident trigger. In an embodiment, communications resources are registered within a communications resources database, such as communications resource database 820.

In step 940, an incident communications network among the communications resources to be marshaled into the incident communications network is established. As discussed above in detail, establishing the incident communications network includes establishing an incident identifier associated with the incident. An electronic message is then transmitted or another means may be used to invite one or more individuals, one or more communications resource, and one or more administrators to be electronically coupled to the incident communications network.

An incident communications network is established among individuals, communications resources and administrators that accept the invitation to be electronically coupled to the incident communications network. Communication rights are granted to communications resources, such that the rights granted for a communications resource are determined by an administrator, individual that controls the communications resource or by communications rights stored in a database. In embodiments, an individual or administrator retains control of communications resources that were under their control prior to the start of the incident.

Each communications resource is invited to join the incident communications network based on the marshalling rule or rules associated with the particular incident trigger. If the primary communications means for inviting a resource is unavailable, then the resource will be notified using an alternative communications means.

Upon determining an incident trigger and establishing an incident communications network, a geographical display of communications resources within a specified geographical area around the incident is displayed. For example, graphical user interface 860 displays a graphical display around the perimeter of the incident that identifies communications resources. The display identifies whether each of the communications resources will be marshaled into the incident communications network and includes a type, organization, status and other information related to each communications resource.

In embodiments, once an incident communications network is established privilege defaults are assigned to communications resource that control access to communications resources within the incident communications network. Additionally, communications resources are monitored to determine communication resources status and location throughout an incident, including receiving status and location information from mobile communications resources.

In other embodiments that include communications resources or administrators having different security level clearances, sessions are created within the incident communications network based upon the classification status of the information source and the security classification of the administrators and communications resources. In such a scenario, the security level of each communications resource and administrator is displayed on a graphical user interface, such as graphical user interface 860. Additionally, communications to administrators or communications resources is controlled based on security level.

In an embodiment, communications resource activity is tracked during an incident. Additionally, communications resources contributions to the incident communications network are rated and one or more rules to determine communications resources that should be marshaled into future incident communications networks may be modified based on the ratings.

In step 950 method 900 ends.

Secure communities, such as the incident communications networks, described above, may be deployed among different types of first responder agencies, different types of homeland security agencies, different types of military units, and even across agencies and military units of different nations, each of which desires to maintain their own highly secure and trusted domains. The need to maintain a high level of security is imposed by highly security sensitive users, and the fundamental articulation of need is expressed is one of a closed network or internetworked enclaves that consist of entities or network members that are implicitly trustworthy. For example, within a particular secure community, resources and users of resources often may belong to the same division or agency, or group of agencies having common security needs.

As stated, the overriding driver for these secure communities is maintaining control over security, such as Certificate Authority (CA) administration, and network and information access and control. Allowing internetworked communications to occur with less trusted community domains represents a risk, especially if internetworked based access is persistently "open," as is often the case.

Notwithstanding the desire for enclaved, secure communities, the missions and operational needs of highly security sensitive communities often requires communications with other entities outside of their communities, often on a temporary and dynamic basis. More generally, for example, consistent with the overall doctrinal mandates within both the joint and coalition military forces context, as well as within the homeland security and defense context, pervasive worldwide interoperability capabilities are critical. The need to maintain security, while also dynamically interconnecting with other secure communities to respond to a particular incident or other temporary circumstance, presents a perplexing challenge.

In an aspect of the present invention, systems and methods are provided that facilitate the establishment of electronic communications connections between two or more secure communities, while ensuring the security of the individual communities. Such secure communities, include, but are not limited to the communities described above, such as interop systems 10 and the incident communications networks established through the marshaling of communications resources, as described with respect to FIGS. 8 and 9.

Figure 10:
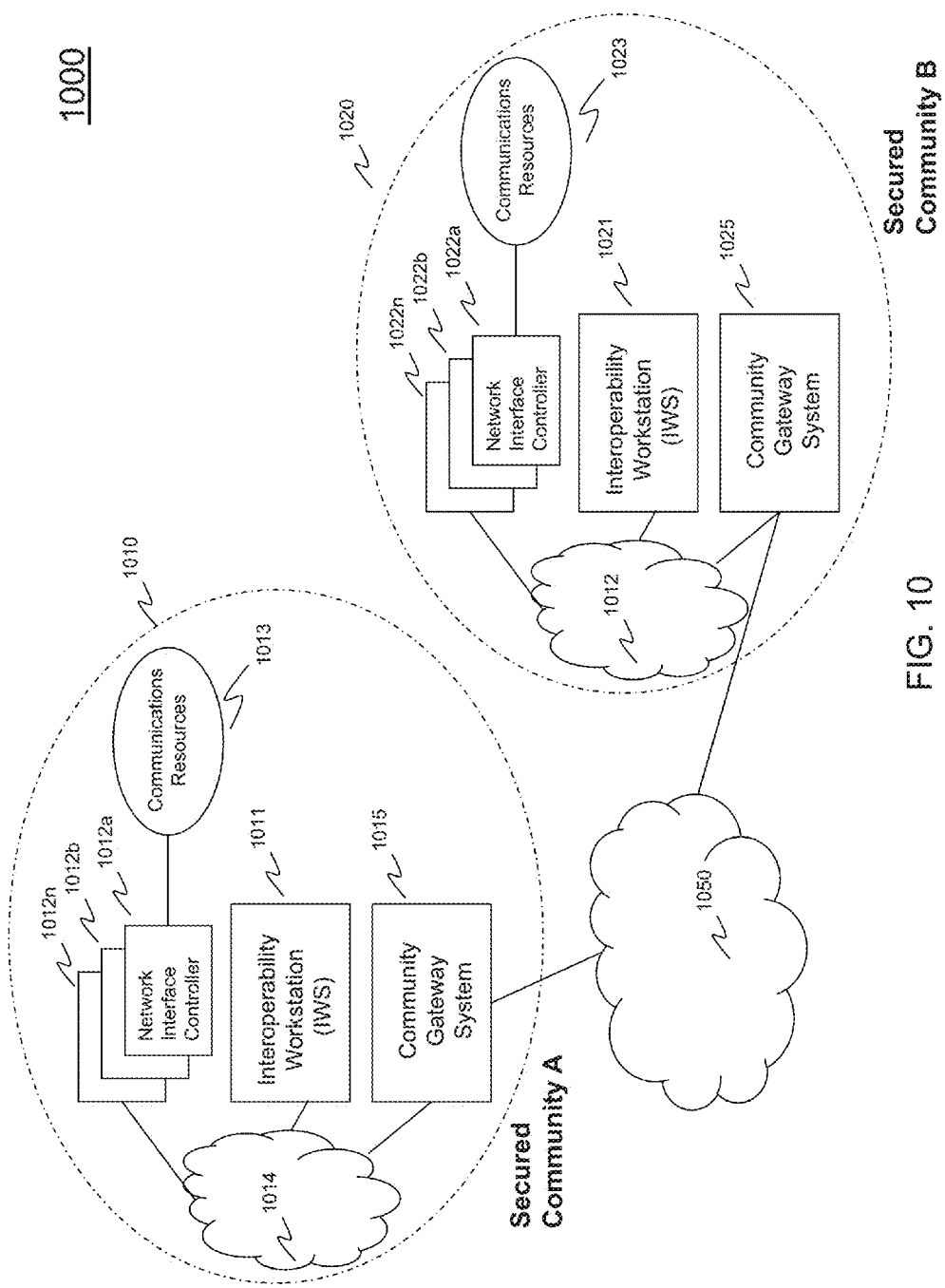
FIG. 10 is a diagram of an electronic communication connection between two secured communities, according to an embodiment of the invention.

FIG. 10 provides a diagram of an electronic communication connection between two secured communities, according to an embodiment of the invention. FIG. 10 illustrates two secure communities, secure community 1010 and 1020. Secure community 1010 includes communications resources 1013, network interface controllers 1012a-n, Interoperability Workstation 1011, network 1014 and community gateway system 1015. Similarly, Secure community 1020 includes communications resources 1023, network interface controllers 1022a-n, Interoperability Workstation 1021, network 1024 and community gateway system 1025. Secure communities 1010 and 1020 are coupled via an electronic communication connection 1020. As explained with respect to FIGS. 11-13, the electronic communication connection 1020 enables selected end points within communications resources 1013 to communicate with selected end points within communications resources 1023 to communicate. While FIG. 10 illustrates only two interconnected secure communities, the invention is not limited to only the interconnection of two secure communities, but can include interconnections among multiple communities, provided each community has a community gateway system, such as a community gateway system 1015 or 1025. Furthermore, while the communities are shown to be composed of interop systems or incident communication networks, they are not so limited, and may include other types of secured communities.

Figure 11:
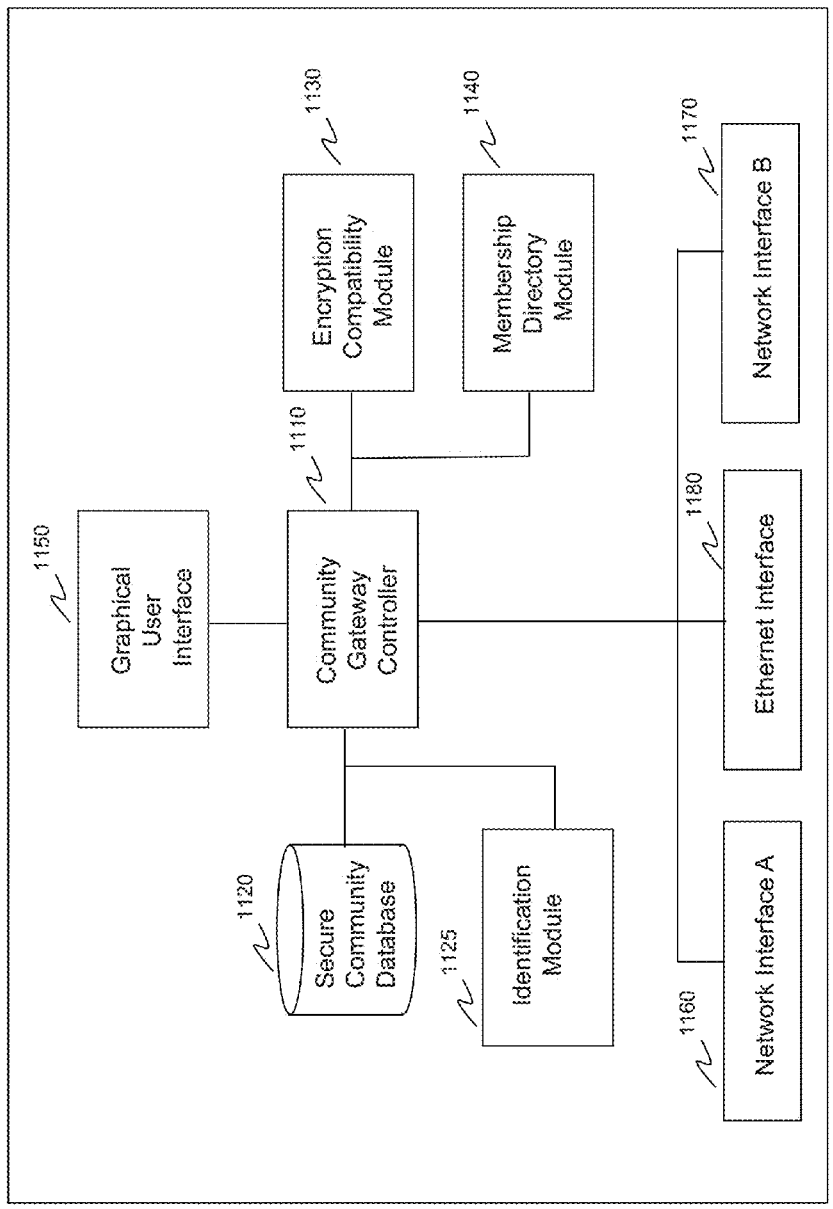
FIG. 11 is a block diagram of a community gateway system, according to an embodiment of the invention.

FIG. 11 provides a block diagram of a community gateway system 1100, according to an embodiment of the invention. Community gateway system 1100 includes gateway controller 1110, secure community database 1120, encryption compatibility 1130, membership directory module 1140, and graphical user interface 1150.

Additionally, community gateway system 1100 includes a variety of network interfaces, including Ethernet interface 1180, network interface A 1160 and network interface B 1170. Network interface A 1160 and network interface B 1170 support either wireless or wireline network interfaces and a variety of networking protocols.

Community gateway system 1100 is a system for establishing an electronic communications connection between two or more secure communities. A secure community includes a collection of communication resources having an administrator that maintains control over the secure community. Examples of secure communities include interop system 10 and the incident communications networks established through the marshaling of communications resources, as described with respect to FIGS. 8 and 9. The present invention enables these communities to connect to other communities on a discretionary and controlled basis, and allow members within in one community to communicate with members of another community on an invitation and acceptance, incident defined basis. Through the use of community gateway system 1100, each secure community administers its own certificate authority (CA) and directory of member endpoints.

Upon receipt of a request to establish a connection between secure communities determines, gateway controller 1110 determines whether to grant the request based on information stored in secure community database 1120 and assigns an encryption level for the connection based on the determination made by encryption compatibility module 1130.

Secure community database 1120 is coupled to gateway controller 1110, and is configured to store secure community information. The secure community information includes secure community identifier information, which includes, but is not limited to secure community identifiers, secure community gateway identifiers, individual identifiers for members within a secure community, and a geographic identifiers for secure communities and/or members of secure communities. The secure community information also includes secure community encryption information. The secure community encryption information includes, but is not limited to a media encryption level for a secure community, and a relative rank of an encryption level for a secure community. Additionally, the secure community information may include a pre-authorized connection indicator for a secure community and/or a pre-authorized connection indicator for members of a secure community.

Encryption compatibility module 1130 is coupled to gateway controller 1110 and is configured to determine an encryption level for a connection between two secure communities. Encryption compatibility module 1130 enables dynamically selected media encryption levels based upon the identity of the endpoints and the level of encryption required by the least trusted party. The encryption compatibility module 1130 ranks encryption schemes of the host secure community relative to encryption schemes of other secure communities. Encryption compatibility module 1130 determines and imposes a certain type of and minimum key strength for media encryption (e.g., AES, DES, RSA) among its endpoint members.

Additionally, encryption compatibility module 1130 issues an alert upon determining that members of a secure community require the use of a lower level of security than the host secure community. In an embodiment, the alert is a visible security state message available to all members with the host secure community.

Secure community membership directory module 1140 is coupled with gateway controller 1110 and is configured to determine what member information within the host secure community is made available to other secure communities. In an embodiment, secure community membership directory module 1110 includes a set of policies that govern the membership information that is made available to other secure communities. In other embodiments, secure community membership directory 1110 includes a pre-set list that identifies the membership information that is made available to other secure communities.

In embodiments, the secure community membership information that is made visible to other secure communities includes one or more of a community gateway identifier, a member of a secure community identifier, and/or an alias for a member of the secure community identifier.

Each secure community controls what membership information may be viewed from outside the community. For example, a secure community may choose for operation reasons to limit views into their community from outside communities. The secure community may choose only to show certain endpoints that represent various areas, functions or departments. Furthermore, a secure community may establish different levels of views based on particular communities and also specific endpoints in the other community. For example, a first secure community may choose to allow a second secure community to have a partial view into the endpoints of the first secure community that have a functional need in common with the second secure community (e.g., the functional need could be an "intelligence" need). That same first secure community, may limit access to a third secure community based on a different functional need or interest.

In the case where endpoints are obscured, gateway controller 1110 may act as an operator and can invite a hidden member of its community into a session involving an external community endpoint. Likewise, gateway controller 1110 that has invited in a hidden endpoint in its community may choose to remove the endpoint from incident participation. Lastly, various endpoints in a community may have an "alias" when dealing with members outside its community.

Graphical user interface 1150 is also coupled to gateway controller 1110, and used to display various user prompts and system status information. For example, upon receiving an invitation to establish a connection with another secure community, graphical user interface 1150 display secure community information regarding the other secure community that seeks to establish a connection. Additionally, in an embodiment, graphical user interface 1110 displays a security indication of a relative rank of the media encryption level of each secure community that has been connected and/or displays a security indication of a relative rank of the media encryption level of each member within secure communities that have been connected. Furthermore, for any incident where there exists endpoints that have an encryption capability level that is not equal to the encryption level for the community, graphical user interface 1150 provides a visual symbol of lower security for the endpoints. Additionally, to differentiate and assist users, out of community endpoints are visually distinguished and their level of security identified.

Figure 12:
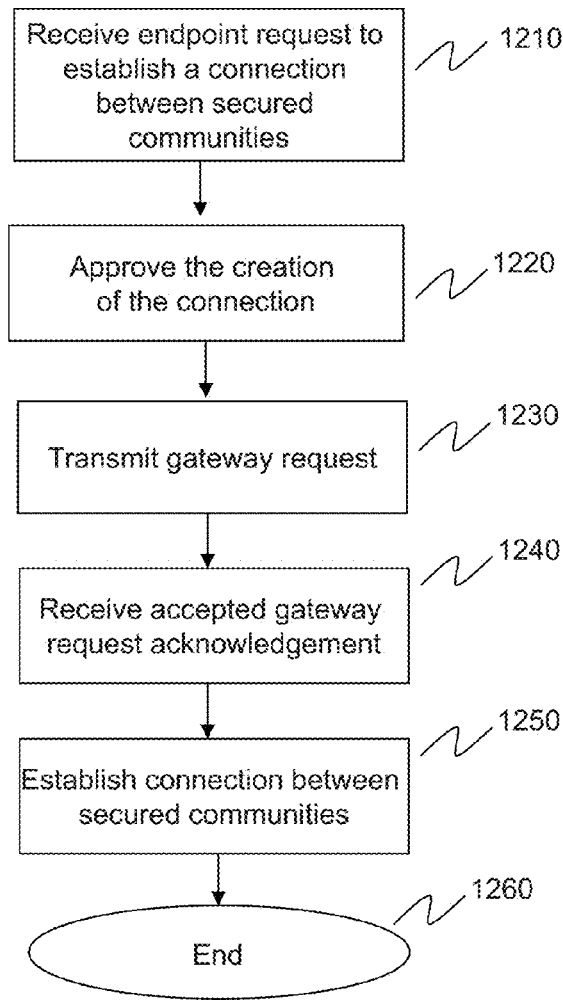
FIG. 12 is a flowchart of a method for establishing an electronic communications connection between two secure communities from the perspective of an originating secure community, according to an embodiment of the invention.

FIG. 12 is a flowchart of a method 1200 for establishing an electronic communications connection between two secure communities from the perspective of an originating secure community, according to an embodiment of the invention.

Method 1200 begins in step 1210. In step 1210, an endpoint request from a communication resource within a host secure community to establish the electronic communications connection to a second secure community is received by a community gateway control system, such as community gateway system 1100.

In step 1220, the creation of the electronic communications connection is approved. In an embodiment, approving the creation of the electronic communications connection includes confirming whether a pre-connection authorization to the second secure community exists within the host community gateway system.

In step 1230, a gateway request to the second secure community to establish the electronic communications connection is transmitted.

In step 1240, an accepted gateway request from the second secure community is received by the community gateway system, such as community gateway system 1100.

In step 1250, an electronic communication connection between the host secure community and the second secure community is established. In an embodiment, a media encryption level for the electronic communications connection based on the identity of the endpoint and a level of encryption required by a least trusted party is also established.

In step 1260, method 1200 ends.

Figure 13:
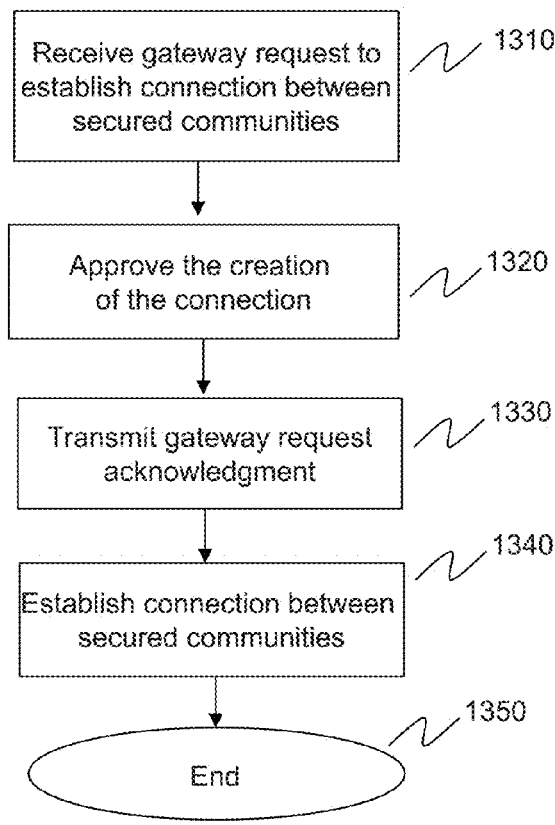
FIG. 13 is a flowchart of a method for establishing an electronic communications connection between two secure communities from the perspective of a receiving secure community, according to an embodiment of the invention.

FIG. 13 is a flowchart of a method 1300 for establishing an electronic communications connection between two secure communities from the perspective of a receiving secure community, according to an embodiment of the invention.

Method 1300 begins in step 1310. In step 1310,

In step 1310, a gateway request from a secure community to establish the electronic communications connection to a second secure community is received by a community gateway control system, such as community gateway system 1100.

In step 1320, the creation of the electronic communications connection is approved. In an embodiment, approving the creation of the electronic communications connection includes confirming whether a pre-connection authorization to the secure community that transmitted the gateway request exists within the receiving community gateway system.

In step 1330, a gateway request acknowledgment to the secure community that transmitted the gateway request to establish the electronic communications connection is transmitted.

In step 1340, an electronic communication connection between the secure community that transmitted the gateway request and the secure community that received the gateway request is established. In an embodiment, a media encryption level for the electronic communications connection based on the identity of the endpoint and a level of encryption required by a least trusted party is also established.

In step 1350, method 1300 ends.

Aerial Mesh Networks Overview

When a natural disaster and/or a man-made scenario occurs existing communication networks can be overwhelmed, congested and disrupted, making it impossible for first responders and emergency personnel to communicate within and beyond the impacted areas. When the incident site or disaster site is physically inaccessible or access to the area is limited, a dynamic wireless aerial mesh network may be deployed to provide persistent wide area coverage for communications services at an incident site. The dynamic wireless aerial mesh network may include multiple airborne aerial nodes that are capable of transmitting, receiving, relaying, and routing communications across a wide area on a persistent basis using flight patterns with adaptive capabilities. By enabling a group of such aerial nodes, working in conjunction with each other as a mesh, a wide area of wireless coverage is created with an enhanced line of sight between an end unit radio transceiver on the ground, and the aerial nodes in the air. In addition, the aerial nodes offer the advantage of being deployed over areas that are otherwise not physically accessible from the ground and/or have limited coverage when deployed at a ground level.

Aerial Mesh Network System

Figure 14:
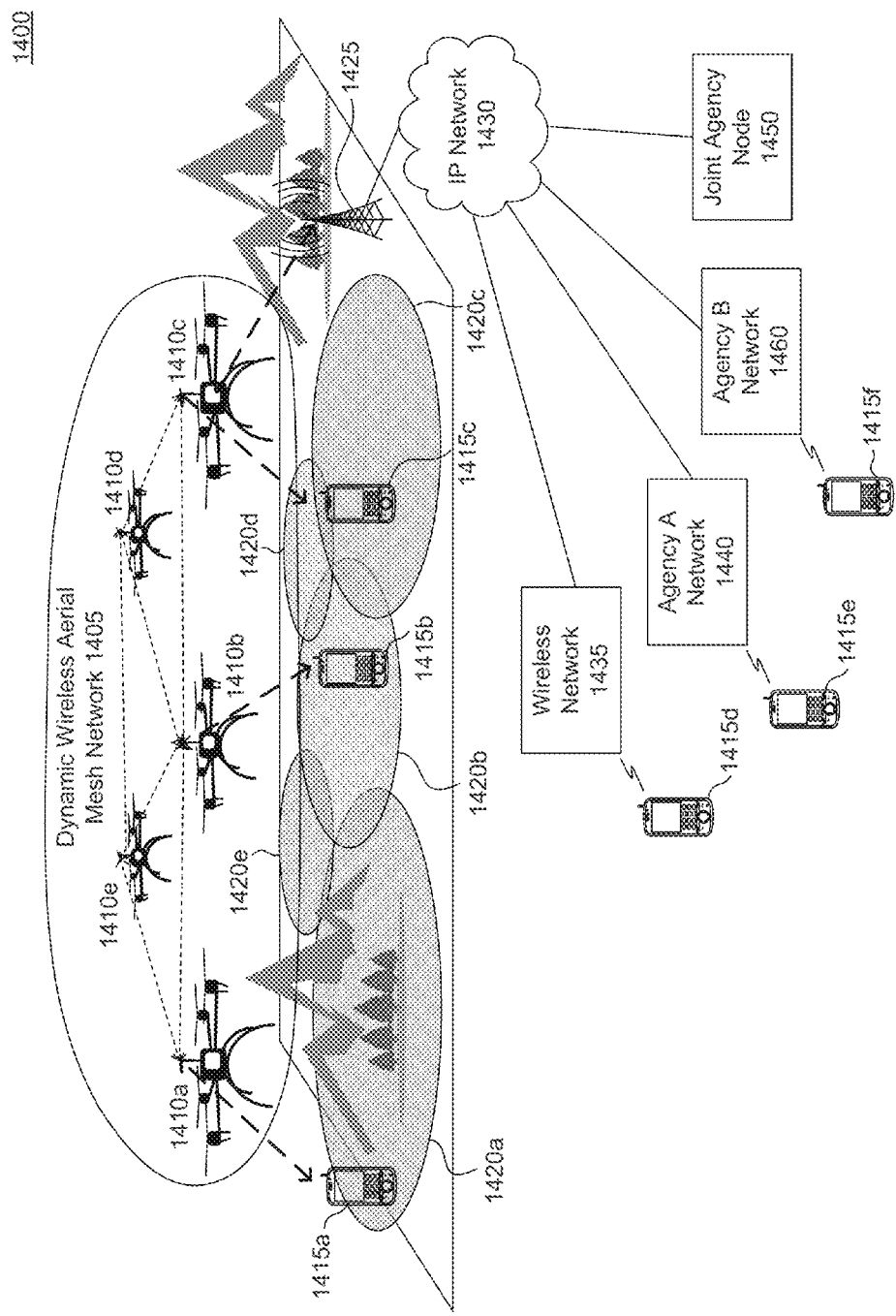
FIG. 14 is a diagram showing an overview of a dynamic wireless aerial mesh network, according to an embodiment.

FIG. 14 is a diagram 1400 showing an overview of a dynamic wireless aerial mesh network, according to an embodiment. For ease of discussion and without limitation, FIG. 14 will be described with reference to elements from FIG. 10. System 1400 supports dynamic wireless aerial mesh network 1405 that provides real-time persistent wide area communications services where the wide area is physically inaccessible via ground transportation. System 1400 also includes ground-based transceiver station 1425 that may be wirelessly coupled to dynamic wireless aerial mesh network 1405 via one or more aerial nodes 1410 shown for example, as aerial node drones. Ground-based transceiver station 1425 may also be coupled via a network such as Internet Protocol (IP) network 1430 to one or more other communication networks such as wireless network 1435 (e.g., a cellular service provider network), Agency A network 1440 (e.g., a secure community network), and Agency B network 1460. End unit radio transceivers, also referred to as mobile devices 1415, include wireless transceivers such as IP-based devices including but not limited to such as smartphones, tablets, laptops, wearable sensors, watches, or remote controllers. In an embodiment, Ground-based transceiver station 1425 may be coupled to an agency network that includes mobile devices that may be legacy radio devices such as Land Mobile radio transceivers.

Many variations of persistent wide area communications services between and among network users are possible based on who owns the dynamic wireless aerial mesh network. For example, when a wireless network provider (e.g., a cellular network provider) owns the dynamic wireless aerial mesh network and a secure communications has not been established between wireless network 1435 and Agency A network 1440 nor Agency B network 1460, mobile devices 1415*a*-1415*d* may communicate between and among each other. In addition, mobile devices 1415*a*-1415*c* may communicate in same fashion as 1415*d* with other end user devices (e.g., a telephone in the Public Switched Telephone Network). However, mobile devices 1415*a*-1415*d* may not communicate with either mobile devices 1415*e* or 1415*f*. In another example, dynamic wireless aerial mesh network 1405 is owned by Agency A and secure communications are not established between Agency A network 1440, Agency B network 1460, nor wireless network 1435, then mobile devices 1415*a*-1415*c* and 1415*e* may communicate between and among each other.

In another example, Agency A Network 1440 and Agency B Network 1460, may be Secured Community A 1010 and Secured Community B 1020 of FIG. 10 that have established secure communications over a network such as IP Network 1430. A secure community or agency includes a collection of communication resources having an administrator that maintains control over the agency. Agency A and Agency B support peer-to-peer wireless communications services among members of agencies responding to an incident based on invitation and acceptance basis. If dynamic wireless aerial mesh network 1405 is owned by Agency A, Agency A network 1440 may invite Agency B Network 1460 to establish secure communications, and Agency B Network 1460 may accept or reject the invitation. In this example, Agency B Network 1460 sends a response accepting the invitation. Once secure communications are established between the agencies, mobile devices 1415*a*-1415*c*, 1415*e*, and 1415*f* may communicate between and among each other. Likewise, if wireless aerial mesh network 1405 is owned by Agency B Network 1460 and secure communications have been established between Agency A Network 1440 and Agency B Network 1460, then mobile devices 1415*a*-1415*c*, 1415*e*, and 1415*f* may communicate between and among each other.

In an embodiment, Joint Agency Node 1450 may be a multi-agency node established in response to an incident for establishing secure communications between and among agencies responding to an incident based on an invitation and acceptance basis. For example, Joint Agency Node 1450 may send a request to Agency A network 1440 and to Agency B 1460 that are both responding to the incident to establish a decentralized peer-to-peer secure communication (e.g., in contrast to a central control command) between and among Agency A Network 1440, Agency B Network 1460, and Joint Agency Node 1450. An operator in each of Agency A Network 1440 and Agency B Network 1460 determines (manually, automatically, or semi-automatically) to accept, conditionally accept, or deny the request. For example, an acceptance may be conditional based on at least one of a time, a location, a priority, and/or other parameters and values.

An aerial node may be equipped with a wireless transceiver and an antenna structure. An aerial node may be coupled to a pilotless or unmanned aerial drone, or a non-drone aerial platform such as a balloon, an aerostat, or a piloted or a manned plane to form a dynamic wireless aerial mesh network. A pilotless aerial drone may include a remotely controlled drone, an auto-piloted or machine flown drone, or a hybrid thereof. An aerial node coupled to a pilotless aerial drone may be called an aerial node drone (AND). Although examples include ANDs, the embodiments are not so limited. In addition, combinations of different aerial node platforms are possible in a dynamic wireless aerial mesh network. For example, a dynamic wireless aerial mesh network may include a combination of aerial nodes on platforms including but not limited to a pilotless aerial drone, a balloon, an aerostat, and/or a piloted plane.

Dynamic wireless aerial mesh network 1405 includes multiple ANDs 1410a, 1410b, 1410c, 1410d, and 1410e that are capable of transmitting, receiving, routing, and relaying communications across a wide area on a persistent basis using flight patterns with adaptive capabilities. ANDs 1410a-1410e work in conjunction to provide persistent wide area wireless coverage areas 1420a, 1420b, 1420c, 1420d, and 1420e for communications services with an enhanced line of sight between mobile units 1415a, 1415b, and 1415c on the ground. For example, mobile units 1415a, 1415b, and 1415c each have a line of sight respectively, with ANDs 1410a, 1410b, and 1410c. ANDs 1410 of wireless aerial mesh network 1405 may transmit, receive, and relay voice and data communications between each other as well as to and from one or more mobile units 1415 directly, or indirectly.

An AND 1410 may include an addressable wireless transceiver which enables communications between and among other ANDs 1410 of wireless aerial mesh network 1405. In addition, the addressable wireless transceiver may enable wireless communications from one AND 1410 to be received by another AND 1410, routed, relayed or re-transmitted to any other AND 1410. For example, mobile device 1415a may send a wireless communication to mobile device 1415c via AND 1410a, 1410b, and 1410c.

In an embodiment, an AND comprises a unique identification number that includes but is not limited to at least one of: a unique aircraft identification number, a registration number, a MAC address of an embedded hardware, or a designated sequence slot assignment within a multi-AND flight coverage pattern. A designated sequence slot assignment may be temporarily assigned or inherited based on a fixed location point or area related to air to ground radio coverage area. An AND may be assigned as a member to one or more uniquely identified dynamic wireless aerial mesh networks. The dynamic wireless aerial mesh networks ID may be transmitted or broadcast wirelessly within its radio coverage area. An AND may simultaneously be a member of more than one dynamic wireless aerial mesh network, dynamic wireless aerial mesh subnetwork, or dynamic wireless aerial mesh supernetwork. Each dynamic wireless aerial mesh network may require a unique passcode, encryption key or other authentication for an AND or any other radio device that may access the dynamic wireless aerial mesh network.

An AND may publish information to another AND in the same dynamic wireless aerial mesh network, or subscribe and receive published information from another AND. Published information may include but is not limited to at least one of an AND identification number, a geo-location, an address, a channel, a protocol, bandwidth availability, a communications priority, a signal strength, a proximity to another AND, or a proximity to a ground station.

Wireless communications may be digitally encoded or analog encoded wireless signals, or analog and digital wireless signals which are decoded and re-encoded and re-transmitted in analog or digital formats to other ANDs. One or more channels within a dynamic wireless aerial mesh network or among two or more dynamic wireless aerial mesh networks may be bridged using a gateway device that enables communications to be routed, relayed or re-transmitted among the ANDs.

System 1400 may employ IP or other digital addressing and routing schemes employing distributed or shared directories which are stored in one or more AND 1410 and may be called from resident memory of an on board computing device of an AND 1410. Communications may be sent using IP-based unicast or multicast methods.

In an embodiment, AND 1410c receives a wireless communication from ground base station 1425 associated with Agency A, and sends the wireless communication to end unit radio transceiver 1415c associated with the Agency A, where the sending is via AND 1410c of two or more ANDs of a dynamic wireless aerial mesh network 1405 that provides real-time persistent wide area communications service, where the wide area is physically inaccessible via ground transportation, and where a flight pattern of the two or more ANDs of the first dynamic wireless aerial mesh network is adaptive.

Figure 15:
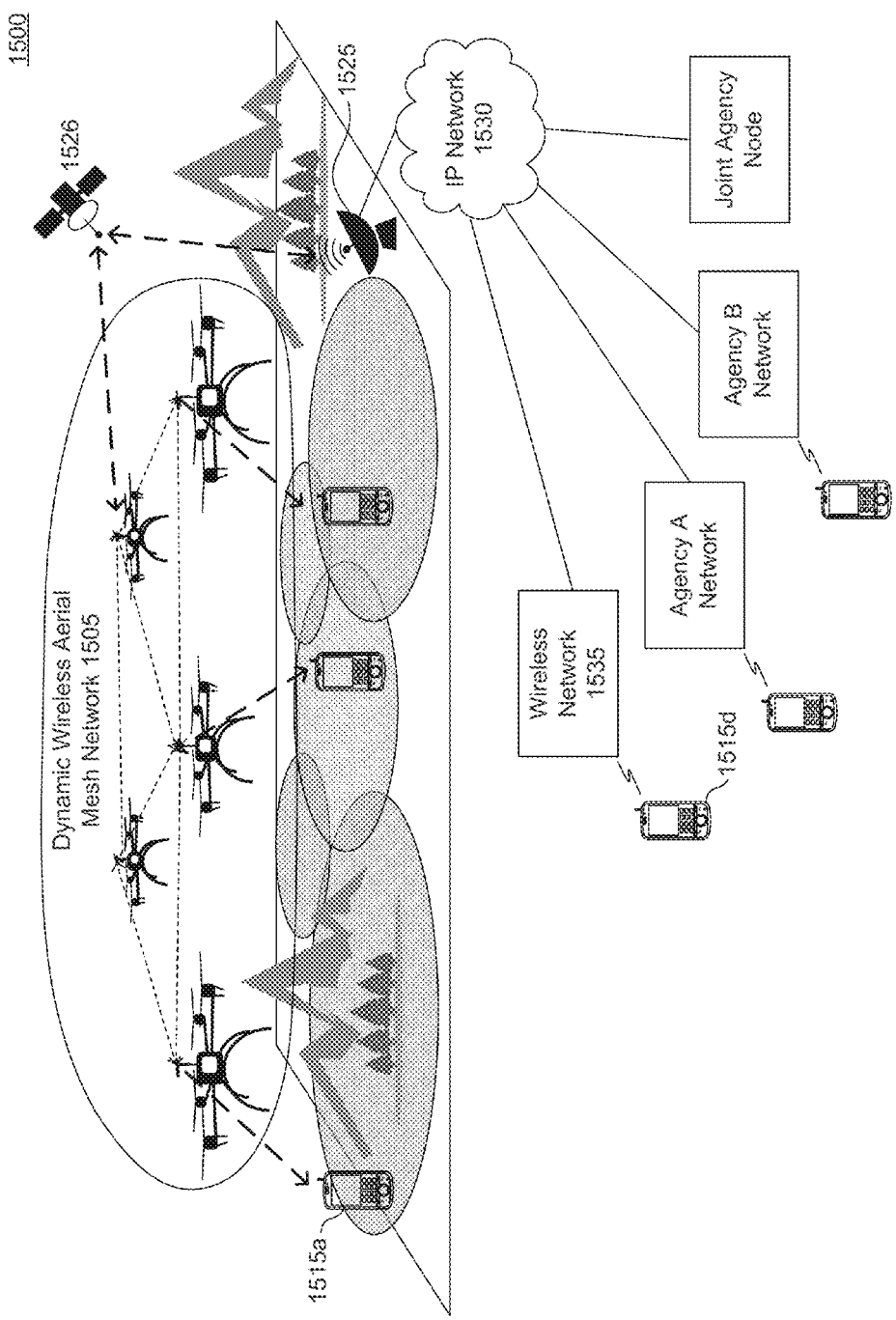
FIG. 15 is a diagram showing an overview of a dynamic wireless aerial mesh network, according to another embodiment.

System 1400 also includes a ground-based transceiver station 1425 that may be wirelessly coupled directly or indirectly to one or more ANDs 1410 such as AND 1410c. To achieve wide area coverage, dynamic wireless aerial mesh network 1405 may rely on wired connectivity backhaul present at one or more of ground-based transceiver station 1425. FIG. 15 is a diagram 1500 showing an overview of dynamic wireless aerial mesh network 1505, according to another embodiment. For example, dynamic wireless aerial mesh network 1505 may use connectivity to an overhead satellite 1526 and satellite dish 1525. For example, satellite dish 1525 may be connected securely to a dedicated private network (not shown) or through a public network such as IP network 1530 via secure encrypted IP-based tunnels. For example, assuming wireless network 1535 owns dynamic wireless aerial mesh network 1505, mobile device 1515a may communicate with mobile device 1515d via dynamic wireless aerial mesh network 1505, satellite 1526, satellite dish 1525, IP Network 1530, and wireless network 1535.

Figure 16:
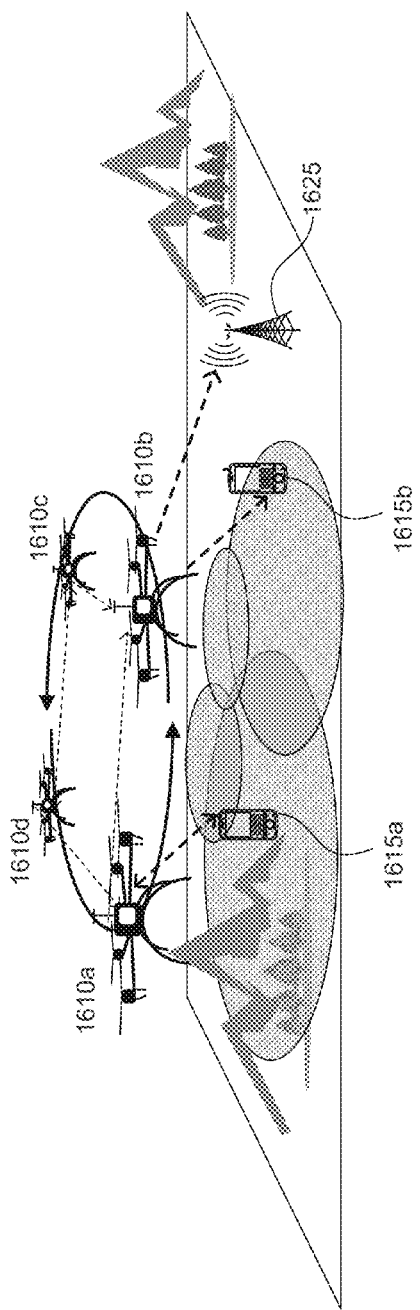
FIG. 16 is a diagram of a flight pattern, according to an embodiment.

FIG. 16 is a diagram 1600 of a flight pattern, according to an embodiment. ANDs 1610a-1610d of a dynamic wireless aerial mesh network fly in a pattern (e.g., a circular pattern) maintaining wide-area connectivity among the one or more mobile devices 1615a and 1615b on the ground, and ground-based transceiver station 1625. In an embodiment, a ground-based device maintains connectivity with an AND, and the connectivity may switch from one AND to another. The operation is similar to the manner in which a moving mobile device may roam from one access point to another in WiFi, or a handset may experience a handoff from a 4G/LTE ground-based wireless base station to another, but in the embodiment, an AND moves while the one or more ground-based devices may be stationary or in motion. For example, mobile device 1615a is wirelessly coupled with AND 1610a, and ground-based transceiver station 1625 as well as mobile device 1615b are wirelessly coupled with AND 1610b. As the ANDs proceed through the flight pattern, mobile device 1615a (or AND 1610a) may initiate a handoff of mobile device 1615a from AND 1610a to AND 1610d.

Figure 17:
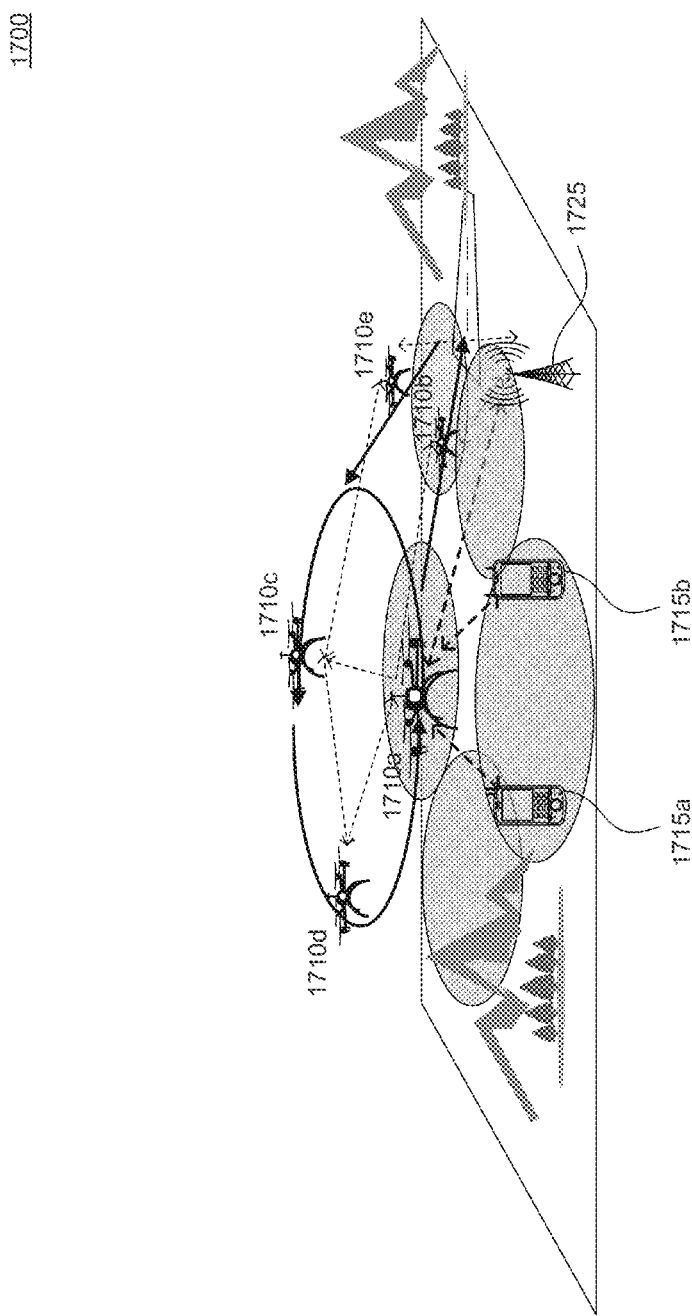
FIG. 17 is a diagram of a persistent coverage rotation, according to an embodiment.

FIG. 17 is a diagram 1700 of a persistent coverage rotation, according to an embodiment. A dynamic wireless aerial mesh network may provide real-time persistent wide area communications service due to wide area coverage over an extended duration. The wide area coverage may be created using an air rotation scheme where ANDs in the dynamic wireless aerial mesh network may be scheduled to launch and land in a staggered basis taking into consideration the actual and/or projected flight duration time of ANDs. A token slot method may be used for example, where N number of ANDs may occupy a relational position within a shared flight path coverage pattern where N is a positive integer. As a first AND completes the shared flight path coverage pattern, the first AND may land and retire from the network while a replacement AND is launched to fill the vacated slot. For example, in diagram 1700, four ANDs 1710a-1710d occupy a relational position with a flight path coverage pattern. As AND 1710b completes the shared flight path coverage pattern and lands, replacement AND 1710e is launched to fill the slot vacated by AND 1710b to maintain the relational position between ANDs 1710a and 1710c.

Figure 18:
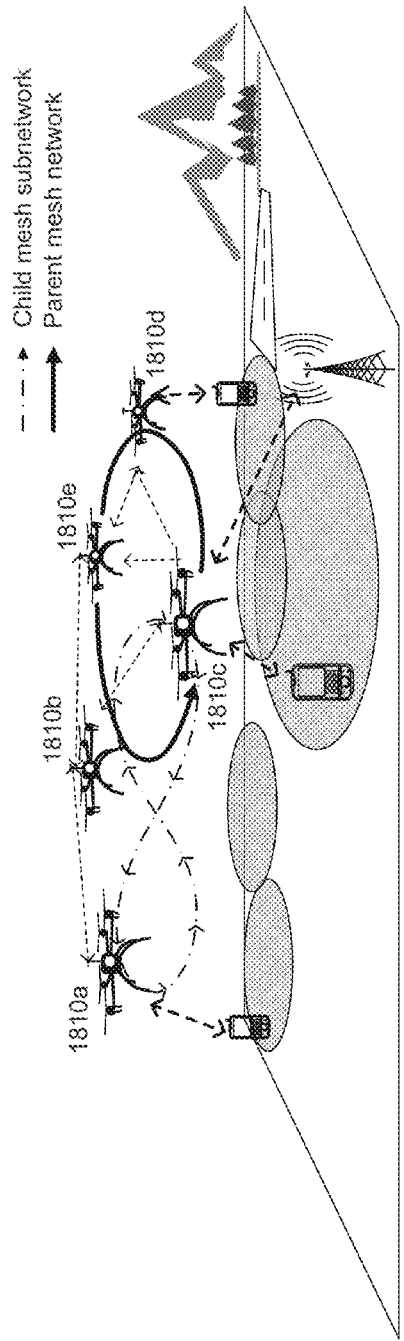
FIG. 18 is a diagram of a mesh subnetwork, according to an embodiment.

FIG. 18 is a diagram 1800 of a dynamic wireless aerial mesh subnetwork, according to an embodiment. In a dynamic wireless aerial mesh network comprised of ANDs, a subset of the ANDs may be assigned as members of a dynamic wireless aerial mesh subnetwork (e.g., a child dynamic wireless aerial mesh subnetwork) which has a uniquely assigned identifier. The remaining ANDs from the original dynamic wireless aerial mesh network may be considered a parent dynamic wireless aerial mesh network, or a separate dynamic wireless aerial mesh subnetwork. In some cases the ANDs of the child dynamic wireless aerial mesh subnetwork may be assigned a flight pattern or flight path that is different from the parent dynamic wireless aerial mesh network or other dynamic wireless aerial mesh subnetworks. For example, the parent dynamic wireless aerial mesh network may originally include ANDs 1810a-1810e. Subsequently, ANDs 1810a and 1810b may receive flight commands assigning them to a different flight pattern than the remaining ANDs 1810c-1810e of the parent mesh network. One or more mesh subnetworks or supernetworks (discussed below) may use a common or shared communications channel or employ a separate radio communications channel.

Figure 19:
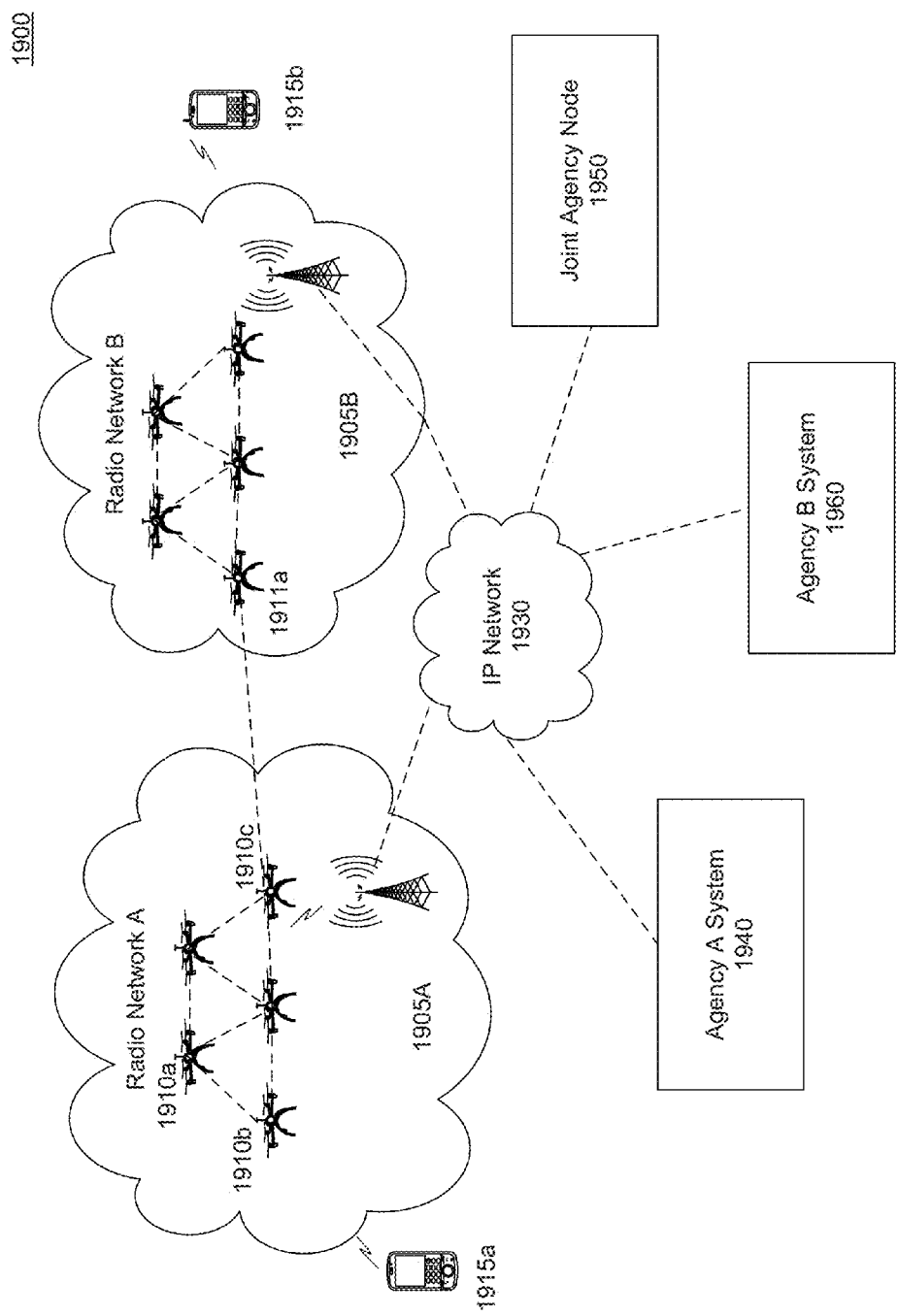
FIG. 19 is a block diagram of a system supporting a dynamic wireless aerial mesh supernetwork, according to an embodiment.

FIG. 19 is a block diagram of a system 1900 supporting a dynamic wireless aerial mesh supernetwork, according to an embodiment. System 1900 includes an Agency A system 1940, Agency B system 1960, IP network 1930, Radio network A that includes dynamic wireless aerial mesh network 1905A, Radio network B that includes dynamic wireless aerial mesh network 1905B, and joint agency node 1950. Each agency system connects, routes, and exchanges multimedia communications among clients on computing devices such as mobile devices 1915a and 1915b. Two distinct dynamic wireless aerial mesh networks or mesh subnetworks associated with different agencies, may be joined together as a joint agency mesh supernetwork. The supernetwork mesh is assigned a unique identifier, and each AND is a member of both the supernetwork mesh as well as their respective mesh network or mesh subnetwork.

An AND may automatically join an existing dynamic wireless aerial mesh network when in communications proximity to any one or more ANDs of the existing dynamic wireless aerial mesh network and the AND is associated with the same agency as the existing dynamic wireless aerial mesh network. In an embodiment, AND 1910a may detect a new AND 1910b in communications proximity, where the new AND 1910b is also associated with Agency A. For example, AND 1910a may exchange transponder data to determine that AND 1910b is associated with Agency A (e.g., AND 1910a may have the published information regarding permission for AND 1910b to join mesh network 1905A). Alternatively, AND 1910a may send a request to and receive a response from an administrator in Agency A system 1940 regarding permission for AND 1910b to join mesh network 1905A. The request and response to the request may be made via the network or out-of-band.

Subsequently, new AND 1910b may join dynamic wireless aerial mesh network 1905A. AND 1910a and the remaining ANDs of dynamic wireless aerial mesh network 1905A may change to a new flight path based on the addition of the new AND 1910b. For example, AND 1910a may determine a new flight path based on the addition of AND 1910b, or AND 1910a may receive a new flight path from Agency A system 1940 based on the addition of AND 1910b.

In an embodiment, an AND may detect a new AND in communications proximity, where the new AND is associated with a second agency, where the first and second agencies are associated with an incident. The first and second agencies communicate securely, and each agency includes a collection of communication resources having an administrator that maintains control over the agency. For example, Agency A system 1940 may send an invitation to Agency B system 1960 to establish a secure communication, and Agency B may accept or decline. In another example, joint agency node 1950, a distributed or shared control administration system, may send an a peer-to-peer invitation to both Agency A system 1940 and Agency B system 1960 to establish a secure communication among Agency A, Agency B, and joint agency node 1950. Agencies A and B may decide whether they choose to accept, conditionally accept, or decline to establish a secure communication.

System 1900 may employ one or more administrators which are human and/or computer based, that grant or deny permissions to ground users to exercise ground control over one or more ANDs. When ANDs within dynamic wireless aerial mesh supernetwork comprise ANDs 1910 and 1911 owned or controlled by more than one operator or agency, a distributed or shared control administration system may be utilized where requests may be sent by users or other administrators of another operator or agency to an owning administrator requesting a grant of control. This may be approved or denied by the administrator, and may be conditioned by time, location, priority and/or other parameters.

For example, AND 1910c may detect a new AND 1911a in communications proximity, where the new AND 1911a is associated with Agency B. In this case, Agencies A and B are associated with an incident (e.g., national disaster) and have established secure communications between their networks. For example, Agency A and Agency B may publish (e.g., exchange or share) information about the ANDs or a select group of ANDs associated with their respective agencies to agencies with whom they have established secure communications. AND 1910c may receive a request from new AND 1911a to join dynamic wireless aerial mesh network 1905A. Since secure communications have been established between Agency A and Agency B (e.g., AND 1911a information may have been published and obtained by AND 1910c), AND 1910c may send an acceptance to new AND 1911a to join dynamic wireless aerial mesh network 1905A. Alternatively, AND 1910c may decline the request, or reply with a conditional acceptance based on at least one of a time, a location, a priority, and/or other parameters and values. For example, AND 1910c may accept the request but only for the next 12 hours. When AND 1910c accepts the request, new AND 1911a may join dynamic wireless aerial mesh network 1905A. AND 1910c and the remaining ANDs of dynamic wireless aerial mesh network 1905A may change to a new flight path based on the addition of the new AND 1911c.

In an embodiment, AND 1910c may receive a request from new AND 1911a to join dynamic wireless aerial mesh network 1905A. AND 1910c may send a request to an administrator in Agency A system 1940 requesting permission for AND 1911a to join mesh network 1905A. The request and response to the request may be made via the network or out-of-band. The administrator in Agency A system 1940 may send a response to AND 1910c accepting, denying, or accepting conditionally the request for new AND 1911a to join dynamic wireless aerial mesh network 1905A. When AND 1910c sends an acceptance response for new AND 1911a to join dynamic wireless aerial mesh network 1905A, AND 1910c and the remaining ANDs of dynamic wireless aerial mesh network 1905A may change to a new flight path based on the addition of the new AND 1911c.

In an embodiment, new AND 1911a is coupled to dynamic wireless aerial mesh network 1905B associated with Agency B. ANDs 1910 change to a new flight path based on the addition of the remaining ANDs of dynamic wireless aerial mesh network 1905B. As an example, AND 1910b may receive and relay a second wireless communication from end unit radio transceiver 1915a associated with Agency A to AND 1910c. AND 1910c may send the second wireless communication to end unit radio transceiver 1915b associated with Agency B via new AND 1911a, and dynamic wireless aerial mesh network 1905B.

Figure 20:
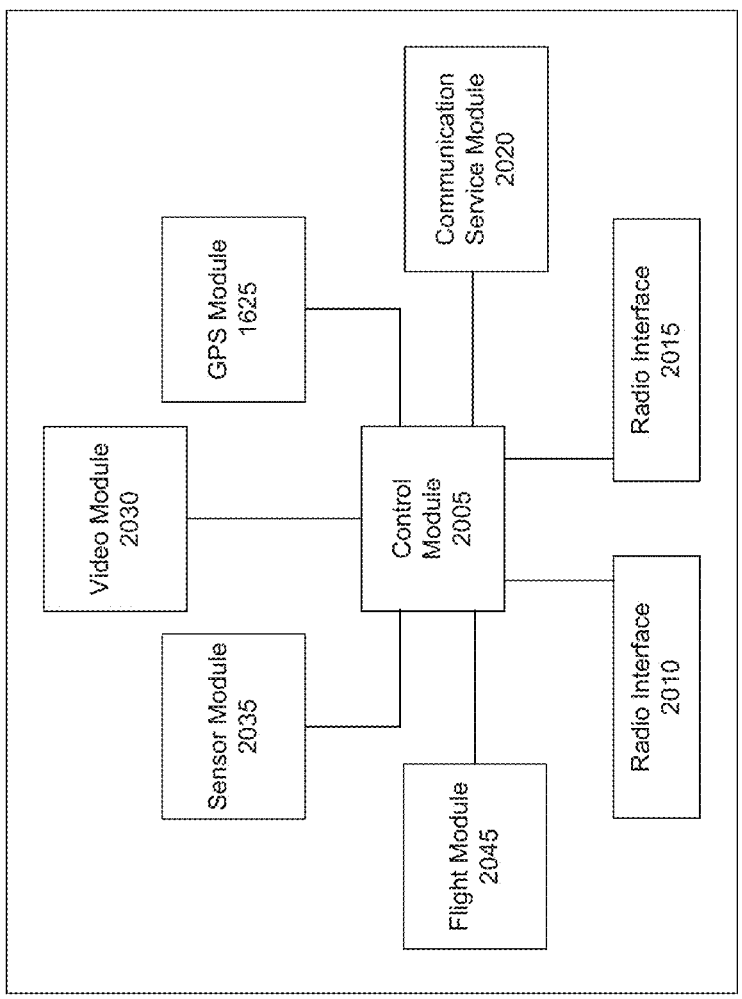
FIG. 20 is a block diagram of an aerial node, according to an embodiment.

FIG. 20 is a block diagram 2000 of an aerial node (AN), according to an embodiment. For ease of discussion and without limitation, FIG. 20 will be described with reference to elements from FIG. 14, FIG. 18, and FIG. 19. An AND includes but is not limited to at least one of: a processor, a memory, an antenna, a transceiver, geographical waypoint system for determining latitude, longitude, altitude, and/or time, a camera, a sensor, a transponder, and flight mechanisms (e.g., propellers, engine). The following modules may be implemented in hardware, software, or a combination of hardware and software to perform the functions of an AND: Control module 2005 manages the operation of the AND, wireless communications are sent and received via radio interfaces 2010 and 2015, communication service module 2020 performs the functions of a wireless communications services application, GPS module 2025 provides geographical waypoint information, video module 2030 records and forwards images including video data, sensor module 2035 monitors and detects certain conditions, and flight module 2045 manages the airborne aspects including flying with other ANDs in a dynamic wireless aerial mesh network.

An AND is typically remotely controlled. The remote control provides the capability of directing and controlling the flight path of each AND. The remote control may be accomplished manually, automatically, or semi-automatically (e.g., a combination of manual and automatic control). The remote control consists of a software and/or hardware application, which may be operated through a server client, or distributed peer application model, wherein the flight paths and patterns of each AND are input and converted into flight commands which are then sent wirelessly to each AND.

Manual remote control may include a human operating a human interface device such as a joystick, control panel, touch screen, or other interface. For example, a user in the field using an application operating on a computing device connected to dynamic wireless aerial mesh network 1405 may remotely send commands to control or alter the flight of one or more ANDs 1410. The ability to change flight paths or create a flight path may employ computer algorithms which take into account flight duration, environmental factors and proximity to the maximum coverage of the dynamic wireless aerial mesh network 1405 to limit or restrict, warn or advise what flight paths a field user may implement.

Automatic remote control may include machine control using rules-based software, hardware and/or other logic that may be in a server coupled to the dynamic wireless aerial mesh network. For example, automatic remote control may enable dynamic wireless aerial mesh network 1405 to be self-healing. For example, when an AND 1410b fails, the remaining ANDs 1410a and 1410c-1410e may detect the failure and adapt their flight pattern to accommodate the change to maintain real-time persistent wide area communications services. The remaining ANDs 1410 may send messages to an automatic remote control in a server in Agency A network 1440 that automatically determines and sends new flight paths and commands to the remaining ANDs 1410.

Semi-automatic remote control may include a combination of manual and automatic remote control, (e.g., a machine assisting a human). For example, remote controls may be in Agency A network 1440 (e.g., a touchscreen used manually in combination with a server) and the flight commands may be sent via IP network 1430, ground-based terminal station 1425 to AND 1410c.

Flight commands may include a speed, a direction, an elevation, a geographical waypoint (e.g., latitude, longitude, altitude, and/or time). Flight commands for AND 1410a may be relayed from AND 1410c through dynamic wireless aerial mesh network 1405 to AND 1410a. An AND may receive flight commands as described above via radio interface 2010. An AND may also receive flight commands via radio interface 2015 (e.g., out-of-band transmissions with a different radio protocol or different frequency). Control module 2005 manages an AND and sends flight commands from remote controller(s) in Agency A network 1440 via radio interface 2010 and/or 2015 to flight module 2045.

In an embodiment, remote control flight commands for an AND is may be dynamically generated based upon rules that utilize information from ANDs 1410 in dynamic wireless aerial mesh network 1405 including but not limited to at least one of: a geospatial position, flight duration, environmental factors, a relative position to a one or more ANDs of an dynamic wireless aerial mesh network, an intended flight path of one or more ANDs, deviations from a planned flight path (e.g., the AND' s deviation, or the one or more ANDs' deviation), a flight condition, a rerouting flight instruction, a ground bandwidth, a density or number of end unit radio transceivers (e.g., mobile devices) in the wide area, or a location of an end unit radio transceiver in the wide area.

In an embodiment, an AND may have an onboard sensor device, that detects and measures an audio level or audio event (e.g., a gunshot or an explosion), a radiation level, a chemical level, a biological condition, a heat level, an electromagnetic signature, a pressure level, a reflective signature, a geo-position coordinate, or a homing beacon signal. In an embodiment, sensor module 2035 may detect, monitor, as well as store/forward the monitored information or a monitored data stream. In addition, sensor module 2035 may execute analytical functions on the monitored data, and when a measurement exceeds a settable threshold value, sensor module 2035 may send a threshold exceeded alert and/or the monitored data stream via radio interface 2010 or 2015 to at least one of: another AND in a dynamic wireless aerial mesh network, an end unit radio transceiver coupled to the dynamic wireless aerial mesh network (e.g., a manual remote controller), or a server coupled to the dynamic wireless aerial mesh network (e.g., an automatic or semi-automatic remote controller).

The alerts can be used by ANDs (or a remote controller) to change flight patterns in response to predetermined rules or parameters. In FIG. 18, for example, a radiation sensor (e.g., sensor module 2035) of AND 1810a measures and detects a radiation release. When the detected radiation level exceeds a threshold value, AND 1810a may generate an alert that is sent to all other ANDs 1810b-1810e in the dynamic wireless aerial mesh network, and/or to a computing device (e.g., a remote controller) that is coupled to the dynamic wireless aerial mesh network.

In an embodiment, AND 1810a determines a new flight path based on the generated threshold exceeded alert, and the remaining ANDs 1810b-1810e adjust their flight pattern accordingly. In another embodiment, the alert is processed by one or more software/hardware modules which are resident in the computing device (e.g., a remote controller server) that issues new flight path commands directing the AND that detected the radiation, AND 1810a, and an adjacent AND, AND 1810b, to form a mesh subnetwork and follow the path of a radiation plume based on its radiation strength. The computing device may also issue new flight path commands and for the remaining ANDs, 1810c-1810e to adjust their flight paths to be adjacent to the radiation area. Further, the new flight path commands for ANDs 1810a and 1810b may include different duties (e.g., focus primarily on radiation-related monitoring and measurements) than the remaining ANDs 1810c-1810e that.

ANDs may have one or more video cameras affixed to their airframes that are capable of at least one of recording, storing and forwarding, or live-streaming images via network connectivity. This network connectivity may occur via the dynamic wireless aerial mesh network itself, or via a separate communications path. Video cameras present on two or more ANDs may be configured to work in conjunction with each other to provide continuous views of one or more locations or objects of interest over time while ANDs move in flight patterns. For example, a viewer might continue to see the same view of a hilltop or roadway, as the video source automatically switches from AND 1410a to AND 1410b to AND 1410c, etc. An object or area of interest may be identified by establishing geo-coordinates and/or using object recognition.

AND flight paths may move or be changed in relation to the location of an object of interest which is stationary or mobile based on a homing beacon signal, object recognition, geo-position coordinates, nuclear radiation, heat sensing or other electromagnetic, pressure or audio signature, laser or other electromagnetic marker or reflective signature, or other or other information which may be observed, interrogated, inspected or measured from an object or item of interest such as a person or vehicle.

A user in the field using an application operating on a computing device (e.g., remote control) connected to dynamic wireless aerial mesh network 1405 may remotely send commands to one or more video cameras on one or more ANDs to pan, tilt and/or zoom by sending commands to the one or more ANDs.

Dynamic wireless aerial mesh network 1405 may be used to capture and stream, or record and forward real-time or time proximate cached views from two or more onboard AND video cameras which may include video metadata including but not limited to time, location, altitude, angle, velocity, frame rate, resolution or other parameter which may be digitally associated or correlated with one another, and may be transformed into one or more other multi-source correlated derivative (MSCD) video works within a video analytics module electronically coupled to dynamic wireless aerial mesh network 1405. The video analytics module may consist of a computer software application which may autonomously or manually in conjunction with a human user operating an application process video inputs and may be coupled to a database module or other callable digital storage space where the derivative video articles and associated original source video input files or viewable media may be read, written or copied by a user connected to dynamic wireless aerial mesh network 1405. In an embodiment, an AND may record images in conjunction with another AND in the dynamic wireless aerial mesh network, and send the images via the first dynamic wireless aerial mesh network or a separate communications path.

MSCD Video may also be combined or correlated with other metadata from sensors or other information such as time, location, proximity or logical relations and displayed or indicated within or in association with MSCD Video files. This information may include, for example, radiological information or flooding data which is displayed or accessed over time or location and may be displayed as a data visualization layer or associated view which is correlated to the MSCD Video metadata or underlying source video metadata. Metadata associated with or related with a video file or source may be encoded within the video transmission or file or may be stored within a relational database structure which may be called, read or displayed.

AND Video and associated Video Metadata or MSCD Video may be digitally associated or correlated with other video sources or other data visualization applications or files, including video derived or generated from video recording devices or modules of user mobile computing devices that are directly or indirectly coupled to dynamic wireless aerial mesh network 1405. Correlations may be based on the user's location, viewing angle, perspective, movement vector, velocity, or other logically based parameters.

An AND may lose communication to a dynamic wireless aerial mesh network. In such an event, there may exist flight instructions and commands in memory of an onboard processor which take priority in the event of a loss of communications directing the AND to one or more pre-determined or recently broadcasted rendezvous points to enable reconnection and communications with the dynamic wireless aerial mesh network. In the event an AND deviates from an established or permitted flight path, or fails to communicate with a dynamic wireless aerial mesh network, an executable computer program may be triggered to execute commands to erase, overwrite or randomize the computer memory of the computer devices on board.

Computer System Implementation

Figure 21:
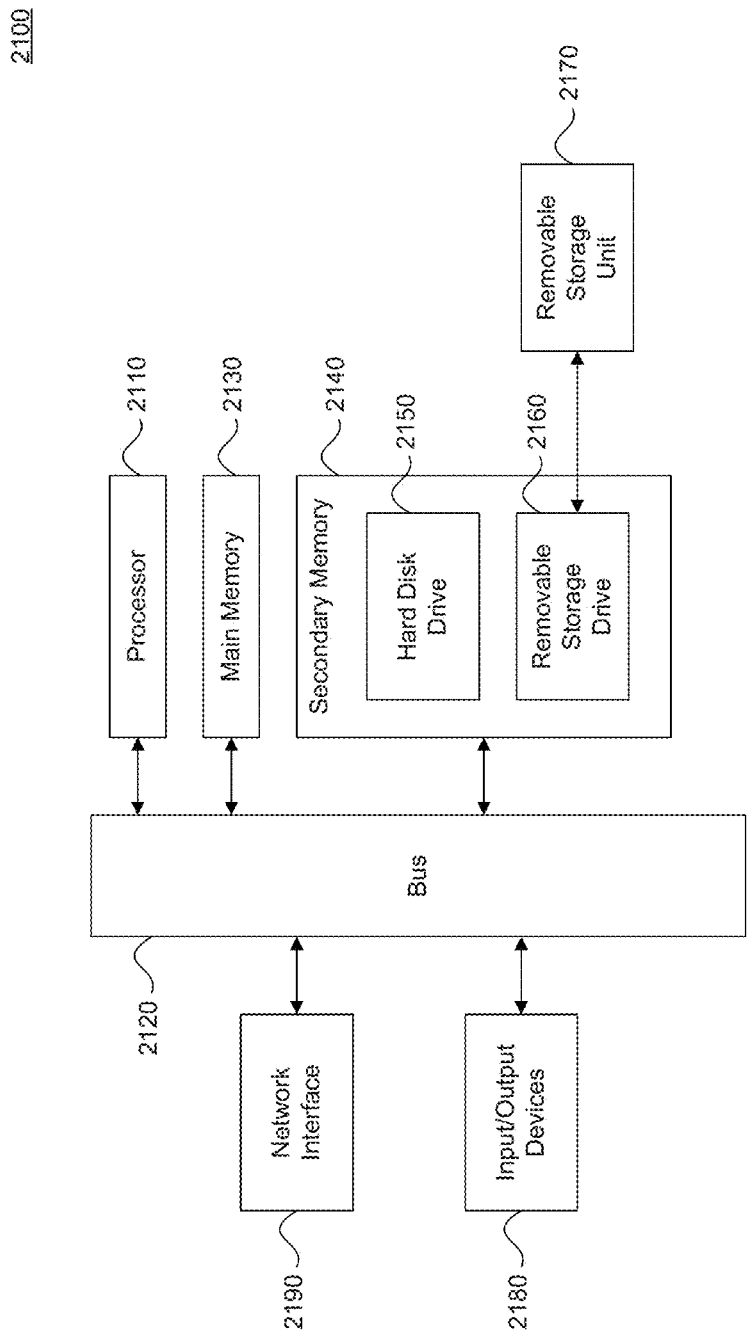
FIG. 21 is an example computer system useable to implement embodiments.

Various aspects of the invention can be implemented by software, firmware, hardware, or a combination thereof. FIG. 21 illustrates an example computer system 2100 in which the present invention, or portions thereof, can be implemented as computer-readable code. After reading this description, it will become apparent to a person skilled in the relevant art how to implement the invention using other computer systems and/or computer architectures.

Computer 2100 includes one or more processors (also called central processing units, or CPUs), such as processor 2110. Processor 2110 is connected to communication bus 2120. Computer 2100 also includes a main or primary memory 2130, preferably random access memory (RAM).

Primary memory 2130 has stored therein control logic (computer software), and data.

Computer 2100 may also include one or more secondary storage devices 2140. Secondary storage devices 2140 include, for example, hard disk drive 2150 and/or removable storage device or drive 2160. Removable storage drive 2160 represents a floppy disk drive, a magnetic tape drive, a compact disk drive, an optical storage device, tape backup, ZIP drive, JAZZ drive, etc.

Removable storage drive 2160 interacts with removable storage unit 2170. As will be appreciated, removable storage unit 2160 includes a computer usable or readable storage medium having stored therein computer software (control logic) and/or data. Removable storage drive 2160 reads from and/or writes to the removable storage unit 2170 in a well-known manner.

Removable storage unit 2170, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 2100, or multiple computer 2100s to perform any combination of the functions described herein.

Computer programs (also called computer control logic) are stored in main memory 2130 and/or the secondary storage devices 2140. Such computer programs, when executed, direct computer 2100 to perform the functions of the present invention as discussed herein. In particular, the computer programs, when executed, enable processor 2110 to perform the functions of the present invention. Accordingly, such computer programs represent controllers of the computer 2100.

Computer 2100 also includes input/output/display devices 2180, such as monitors, keyboards, pointing devices, etc.

Computer 2100 further includes a communication or network interface 2190. Network interface 2190 enables computer 2100 to communicate with remote devices. For example, network interface 2190 allows computer 2100 to communicate over communication networks, such as LANs, WANs, the Internet, etc. Network interface 2190 may interface with remote sites or networks via wired or wireless connections. Computer 2100 receives data and/or computer programs via network interface 2190.

CONCLUSION

The embodiments can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A non-transient computer-readable storage medium having stored thereon computer executable instructions, execution of which by a processing device causes the processing device to perform operations for a first aerial node (AN) of a first dynamic wireless aerial mesh network, the operations comprising:
   receiving a wireless communication associated with a first agency;
   transmitting the wireless communication to an end unit radio transceiver associated with the first agency,
   wherein the transmitting is via the first AN of two or more ANs of the first dynamic wireless aerial mesh network that provides persistent wide area communications service;
   detecting an event; and
   adjusting a flight pattern of the first AN based on changes to the first dynamic wireless aerial mesh network, wherein the changes are based on the event detected.

2. The non-transient computer-readable storage medium of claim 1, wherein the flight pattern of the first AN comprises a persistent coverage rotation cycle, wherein a replacement AN is scheduled to launch and land on a staggered basis based on an actual or projected flight duration time of the two or more ANs.

3. The non-transient computer-readable storage medium of claim 2, wherein a second AN of the two or more ANs occupies a relational position within the flight pattern of the first AN, wherein as the second AN retires, the replacement AN launches to fill the relational position within the flight pattern of the first AN vacated by the second AN.

4. The non-transient computer-readable storage medium of claim 3, wherein the first AN is in communication with the end unit radio transceiver, wherein the operations further comprise:
   initiating a handoff to the replacement AN.

5. The non-transient computer-readable storage medium of claim 1, wherein the adjusting the flight pattern of the first AN operation comprises:
   detecting a failed AN of the first dynamic wireless aerial mesh network; and adapting the flight pattern of the first AN to maintain the persistent wide area communications service.

6. The non-transient computer-readable storage medium of claim 1, wherein the detecting the event operation comprises:
measuring an audio event, a radiation level, a chemical level, a heat level, an electromagnetic signature, a pressure level, a reflective signature, a geo-position coordinate, or a homing beacon signal.

7. The non-transient computer-readable storage medium of claim 6, wherein the detecting the event operation further comprises:
determining that the measurement satisfies a threshold; and
transmitting a threshold alert to an AN of the two or more ANs, the end unit radio transceiver associated with the first agency, or a server coupled to the first dynamic wireless aerial mesh network.

8. The non-transient computer-readable storage medium of claim 7, wherein the operations further comprise:
determining a new flight path based on the threshold alert, wherein the first AN adjusts the flight pattern of the first AN accordingly.

9. The non-transient computer-readable storage medium of claim 7, wherein the operations further comprise:
receiving a new flight path command based on the threshold alert, wherein a remaining AN of the two or more ANs adjusts a flight pattern of the remaining AN accordingly.

10. The non-transient computer-readable storage medium of claim 9, wherein the new flight path command includes different duties than the two or more ANs.

11. The non-transient computer-readable storage medium of claim 1, wherein the adjusting the flight pattern operation comprises:
detecting a new AN in communications proximity, wherein the new AN is associated with the first agency; and
changing to a new flight path based on an addition of the new AN to the first dynamic wireless aerial mesh network.

12. The non-transient computer-readable storage medium of claim 1, wherein the adjusting the flight pattern of the first AN operation comprises:
detecting a new AN in communications proximity, wherein the new AN is associated with a second agency, wherein the first and second agencies are associated with an incident, wherein the first and second agencies communicate securely, and wherein an agency includes a collection of communication resources having an administrator that maintains control over the agency;
receiving a request from the new AN to join the first dynamic wireless aerial mesh network;
transmitting an acceptance to the new AN; and
changing to a new flight path based on an addition of the new AN to the first dynamic wireless aerial mesh network.

13. The non-transient computer-readable storage medium of claim 12, wherein the operations further comprise:
transmitting a second request to the first agency to join the new AN to the first dynamic wireless aerial mesh network; and
receiving a second acceptance to join the new AN to the first dynamic wireless aerial mesh network.

14. The non-transient computer-readable storage medium of claim 13, wherein the transmitting the second request is transmitted out-of-band.

15. The non-transient computer-readable storage medium of claim 12, wherein the new AN is coupled to a second dynamic wireless aerial mesh network associated with the second agency, and wherein the operations further comprise:
receiving a second wireless communication from the end unit radio transceiver associated with the first agency; and
transmitting the second wireless communication to a second end unit radio transceiver associated with the second agency via the second dynamic wireless aerial mesh network.

16. The non-transient computer-readable storage medium of claim 1, wherein the end unit radio transceiver comprises: a legacy radio device, or an Internet Protocol (IP)-based device.

17. The non-transient computer-readable storage medium of claim 16, wherein the IP-based device includes: a smartphone, a tablet, a wearable sensor, a watch, a remote controller, or a laptop computer.

18. The non-transient computer-readable storage medium of claim 1, wherein the operations further comprise:
receiving a flight command including a speed, a direction, an elevation, or a geographical waypoint; and
adjusting the flight pattern of the first AN based on the flight command.

19. The non-transient computer-readable storage medium of claim 18, wherein the flight command is generated manually, automatically, or semi-automatically.

20. The non-transient computer-readable storage medium of claim 18, wherein the flight command is based on a geospatial position.

21. The non-transient computer-readable storage medium of claim 18, wherein the flight command is based on a relative position to a remaining AN of the two or more ANs.

22. The non-transient computer-readable storage medium of claim 18, wherein the flight command is based on an intended flight path of the remaining AN of the two or more ANs.

23. The non-transient computer-readable storage medium of claim 18, wherein the flight command is based on a deviation from a planned flight path of the first AN, or a deviation of a planned flight path an AN of the two or more ANs.

24. The non-transient computer-readable storage medium of claim 18, wherein the flight command is based on a flight condition or a rerouting flight instruction.

25. The non-transient computer-readable storage medium of claim 18, wherein the flight command is based on a ground bandwidth need, a density or number of end unit radio transceivers in a coverage area of the persistent wide area communications service, or a location of one end unit radio transceiver of the number of end unit radio transceivers in the coverage area.

26. The non-transient computer-readable storage medium of claim 1, wherein the first AN comprises a unique identification number that includes a unique aircraft identification number, a registration number, or a MAC address of an embedded hardware.

27. The non-transient computer-readable storage medium of claim 1, wherein the first AN comprises a designated sequence slot assignment within a multi-AN flight coverage pattern.

28. The non-transient computer-readable storage medium of claim 1, wherein the operations further comprise:

recording images in conjunction with another AN of the two or more ANs; and transmitting the images via the first dynamic wireless aerial mesh network or a separate communications path.

29. The non-transient computer-readable storage medium of claim 1, wherein the first AN is coupled to a platform comprising: a pilotless aerial drone, a balloon, an aerostat, or a piloted plane.

30. The non-transient computer-readable storage medium of claim 29, wherein the first AN is coupled to the pilotless aerial drone, and another AN of the two or more ANs of the first dynamic wireless aerial mesh network is coupled to a different platform.

* * * * *

UNITED STATES PATENT AND TRADEMARK OFFICE
CERTIFICATE OF CORRECTION

PATENT NO. : 10,003,397 B2  
APPLICATION NO. : 15/594066  
DATED : June 19, 2018  
INVENTOR(S) : Mazzarella et al.

Page 1 of 1

It is certified that error appears in the above-identified patent and that said Letters Patent is hereby corrected as shown below:

On the Title Page

Replace "the term of this patent is extended or adjusted under 35 U.S.C. 154(b) by 0 days. days." with --the term of this patent is extended or adjusted under 35 U.S.C. 154(b) by 0 days.--.

Signed and Sealed this  
Twenty-eighth Day of May, 2019

Andrei Iancu  
*Director of the United States Patent and Trademark Office*